(12) United States Patent
Watté et al.

(10) Patent No.: US 12,422,636 B2
(45) Date of Patent: Sep. 23, 2025

(54) FIBER ROUTING SYSTEM WITH DIRECT PLC CHIP TERMINATION

(71) Applicant: CommScope Technologies LLC, Hickory, NC (US)

(72) Inventors: Jan Watté, Grimbergen (BE); Cristina Lerma Arce, Gentbrugge (BE); Walter Mattheus, Wijgmaal (BE); Danny Willy August Verheyden, Gelrode (BE)

(73) Assignee: CommScope Technologies LLC, Claremont, NC (US)

( * ) Notice: Subject to any disclaimer, the term of this patent is extended or adjusted under 35 U.S.C. 154(b) by 355 days.

(21) Appl. No.: 18/067,530

(22) Filed: Dec. 16, 2022

(65) Prior Publication Data

US 2023/0194816 A1 Jun. 22, 2023

Related U.S. Application Data

(60) Provisional application No. 63/290,981, filed on Dec. 17, 2021, provisional application No. 63/291,002, filed on Dec. 17, 2021.

(51) Int. Cl.
   *G02B 6/44* (2006.01)
   *F21V 8/00* (2006.01)
   *G02B 6/38* (2006.01)

(52) U.S. Cl.
   CPC ......... *G02B 6/4452* (2013.01); *G02B 6/0028* (2013.01); *G02B 6/0083* (2013.01); *G02B 6/3897* (2013.01); *G02B 6/4454* (2013.01)

(58) Field of Classification Search
   None
   See application file for complete search history.

(56) References Cited

U.S. PATENT DOCUMENTS

| | | | |
|---|---|---|---|
| 6,400,882 B1 | 6/2002 | Sun et al. | |
| 7,397,997 B2 | 7/2008 | Ferris et al. | |
| 7,489,849 B2 | 2/2009 | Reagan et al. | |
| 7,512,304 B2 | 3/2009 | Gronvall et al. | |

(Continued)

FOREIGN PATENT DOCUMENTS

| EP | 1326109 A2 | 9/2003 |
|---|---|---|
| WO | 2012112344 A1 | 8/2012 |

(Continued)

*Primary Examiner* — Jerry Rahll
(74) *Attorney, Agent, or Firm* — Merchant & Gould P.C.

(57) ABSTRACT

The present disclosure relates to a fiber optic assembly including a flexible substrate and a plurality of optical fibers having affixed segments bonded to the flexible substrate along fiber routing paths. The optical fibers having first ends positioned at route termination locations corresponding to optical connection locations. The fiber optic assembly also includes a planar lightguide circuit chip having lightguides optically connected to second ends of the optical fibers including a silicon substrate and a core layer supported by the silicon substrate. Optical signal paths are defined that extend continuously from the first ends of the optical fibers through the second ends of the optical fibers to the lightguides without any optical fiber splices being located along the optical signal paths. The optical device also includes a spring mounted to the planar lightguide circuit chip for biasing the optical fiber into the alignment groove.

17 Claims, 26 Drawing Sheets

(56) References Cited

U.S. PATENT DOCUMENTS

| | | | |
|---|---|---|---|
| 7,653,282 B2 | 1/2010 | Blackwell, Jr. et al. | |
| 7,744,288 B2 | 6/2010 | Lu et al. | |
| 7,903,923 B2 | 3/2011 | Gronvall et al. | |
| 8,985,864 B2 | 3/2015 | Ott | |
| 9,575,272 B2 | 2/2017 | Ott | |
| 2001/0041025 A1* | 11/2001 | Farahi | C08G 77/58 |
| | | | 372/39 |
| 2006/0093303 A1* | 5/2006 | Reagan | G02B 6/4444 |
| | | | 385/76 |
| 2008/0298748 A1* | 12/2008 | Cox | G02B 6/125 |
| | | | 359/618 |
| 2014/0072757 A1* | 3/2014 | Wyrwich | G02B 6/3897 |
| | | | 29/829 |
| 2015/0260927 A1 | 9/2015 | Murray et al. | |

FOREIGN PATENT DOCUMENTS

| | | |
|---|---|---|
| WO | 2013117598 A1 | 8/2013 |
| WO | 2014055859 A1 | 4/2014 |
| WO | 2016043922 A1 | 3/2016 |
| WO | 2016100384 A1 | 6/2016 |
| WO | 2017081306 A1 | 5/2017 |
| WO | 2018017883 A1 | 1/2018 |
| WO | 2018085767 A1 | 5/2018 |
| WO | 2018144128 A1 | 8/2018 |
| WO | 2019040742 A1 | 2/2019 |
| WO | 2019070682 A1 | 4/2019 |
| WO | 2019195602 A1 | 10/2019 |
| WO | 2020112645 A1 | 6/2020 |
| WO | 2021217079 A1 | 10/2021 |

\* cited by examiner

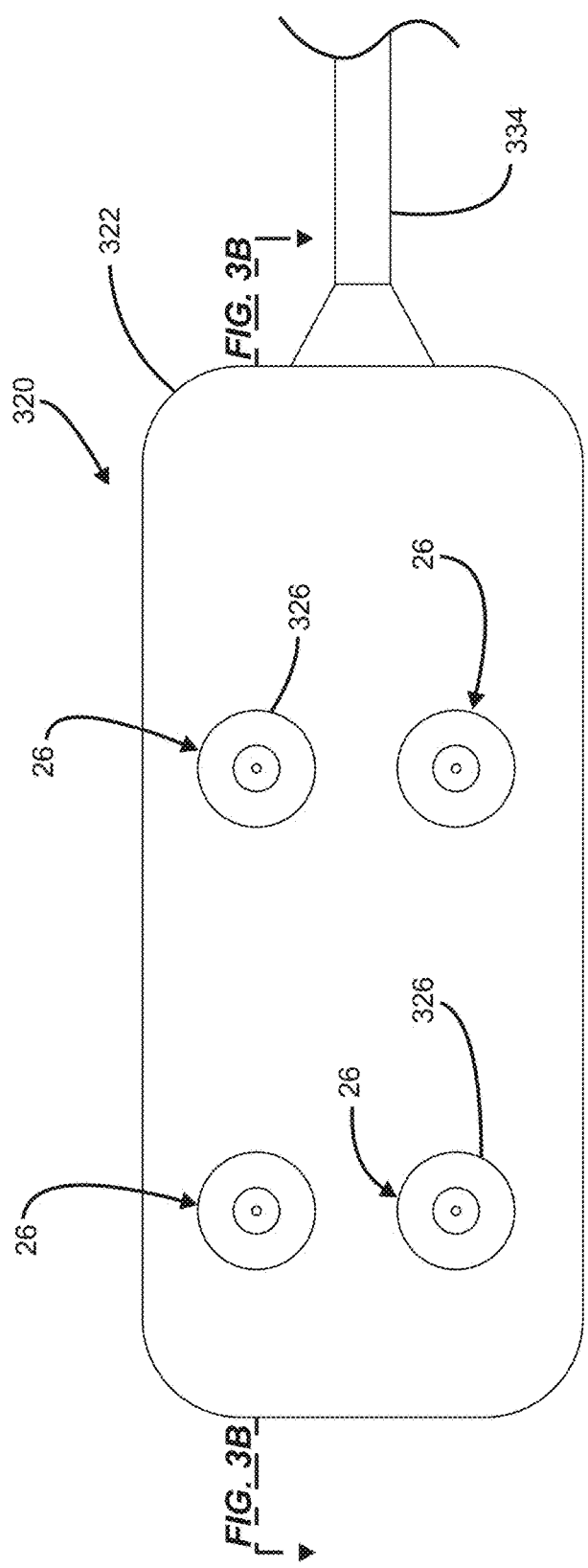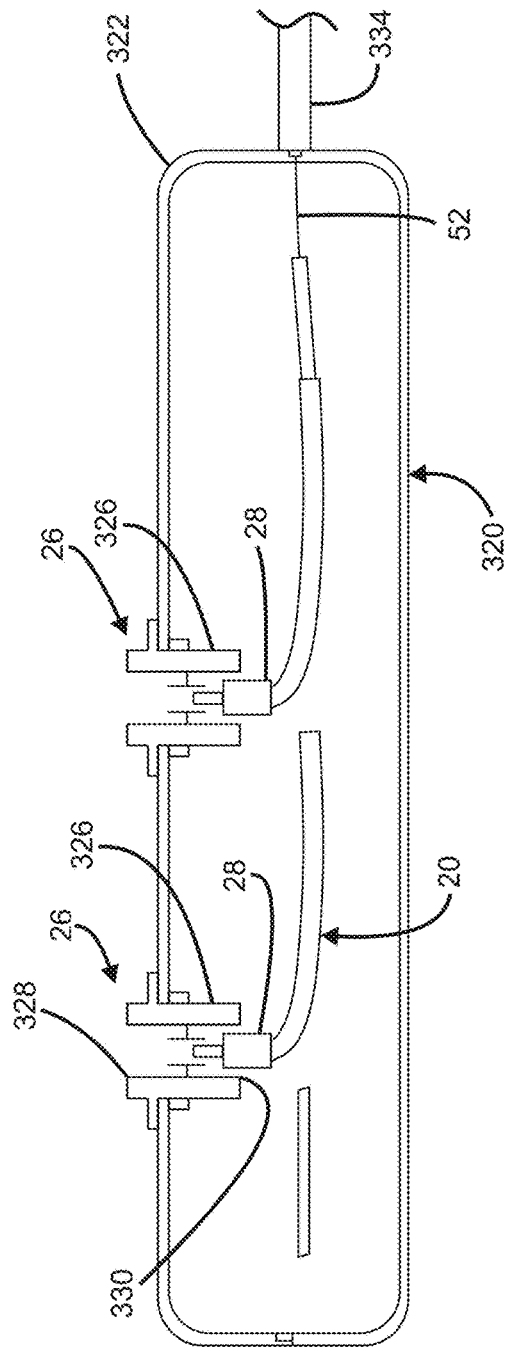

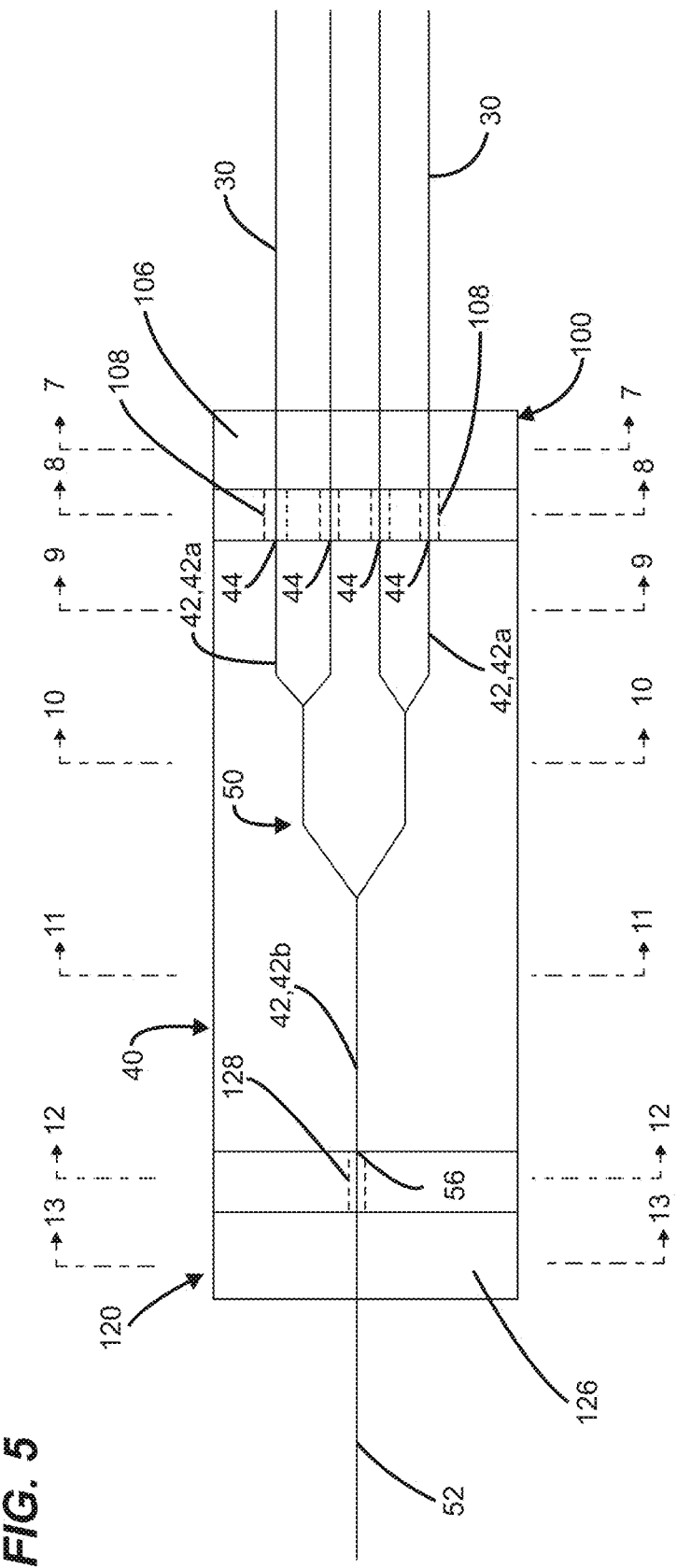
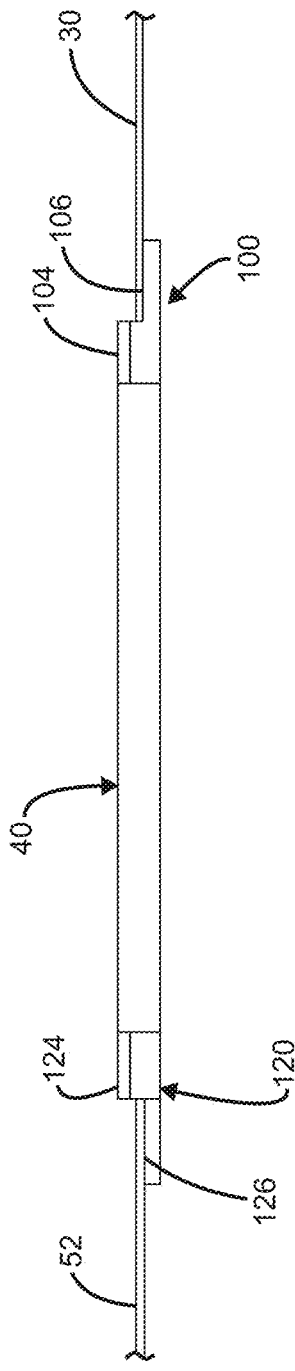
FIG. 5
FIG. 6

FIBER ROUTING SYSTEM WITH DIRECT PLC CHIP TERMINATION

CROSS-REFERENCE TO RELATED APPLICATIONS

This application claims the benefit of U.S. Provisional Application Ser. No. 63/290,981, filed Dec. 17, 2021; and 63/291,002, filed Dec. 17, 2021, the disclosures of which are hereby incorporated by reference in their entireties.

TECHNICAL FIELD

The present disclosure relates generally to fiber routing systems for telecommunication equipment and to light conveying devices such as planar lightguide circuit chip devices.

BACKGROUND

Telecommunication systems typically employ a network of telecommunication cables capable of transmitting large volumes of data and voice signals over relatively long distances. The telecommunication cables can include fiber optic cables, electrical cables, and/or combinations of electrical and fiber optic cables. A typical telecommunication network also includes a plurality of telecommunication enclosures integrated throughout the network of telecommunication cables. The telecommunication cables are often terminated by connectors such as fiber optic connectors. The fiber optic connectors can include single-fiber fiber optic connectors and multiple-fiber fiber optic connectors. Fiber optic connectors are adapted for making de-mateable fiber optic connections between two optical fibers or between two sets of optical fibers. Fiber optic connectors are often coupled together via fiber optic adapters, but certain fiber optic connectors can be directly coupled together without the use of fiber optic adapters.

One example type of enclosure frequently used in a telecommunication system is a multi-service terminal (MST). A multi-service terminal is frequently used near the outer edge of a telecommunication network to provide optical connection points for coupling subscribers to the network via drop cables. A typical multi-service terminal includes a plurality of connector ports that are accessible from outside the terminal. Each of the connector ports is adapted for receiving a ruggedized fiber optic connector that terminates the end of a drop cable. The opposite end of the drop cable is often connected to a subscriber location to connect the subscriber location to the telecommunication network. Example multi-service terminals are disclosed by U.S. Pat. Nos. 7,653,282; 7,397,997; 7,903,923; 7,489,849; and 7,512,304 and are also disclosed by International PCT Publication Nos. WO2019/040742 and WO2019/195602.

Flexible films have been used to support and manage optical fiber routing within telecommunication devices such as modules (e.g., see U.S. Publication No. 2015/0260927 and International PCT Publication Nos. WO2019/070682; WO2014/055859; WO2021/217079 and WO2018/085767).

Additionally, optical fibers can be optically coupled to planar lightguide circuit chips via v-groove blocks bonded to the planar lightguide chips and/or grating couplers. Planar lightguide circuit chips can be manufactured using wafer manufacturing technology in which lightguides are provided on a wafer substrate using techniques including deposition (e.g., chemical vapor deposition, flame hydrolysis deposition, etc.), patterning (e.g., lithographic patterning) and etching (e.g., reactive ion etch, inductively coupled plasma dry etching, etc.). After the lightguides have been provided on the wafer substrate, the wafer substrate can be diced to manufacture a plurality of planar lightguide circuit chips. Aspects of the present disclosure relate to enhancements in these areas.

SUMMARY

One aspect of the present disclosure relates to fiber management systems and methods for facilitating assembling fiber optic devices in an efficient manner by allowing optical fibers to be pre-routed prior to installation in their corresponding fiber optic devices and to be efficiently optically coupled to an integrated waveguide optics device such as a planar lightguide circuit (PLC) chip to reduce signal loss.

Another aspect of the present disclosure relates to a planar lightguide circuit chip device having an optical fiber coupling arrangement that is configured coupled in the field without an optical splice.

Another aspect of the present disclosure relates to a planar lightguide circuit chip device having an optical fiber coupling arrangement that is mateable and demateable with respect to a corresponding optical fiber or optical fibers. In certain examples, the optical fiber is incorporated as part of a bare fiber (e.g., ferrule-less) fiber optic connector that is mateable and demateable with respect to the planar lightguide circuit chip device. In certain examples, the optical fiber is aligned with a lightguide of the planar lightguide circuit chip by a v-groove defined by a silicon base substrate of a planar lightguide circuit chip of the planar lightguide circuit chip device. In one example, the planar lightguide circuit chip device includes at least one spring for biasing the optical fiber into the v-groove against fiber alignment surfaces of the v-groove.

Yet another aspect of the present disclosure relates to an optical device configured to optically couple with a ferrule-less fiber optic connector. The device includes a planar lightguide circuit chip including a silicon substrate and a core layer supported by the silicon substrate. The core layer includes at least one lightguide. The silicon substrate defines at least one alignment groove for aligning an optical fiber of the ferrule-less connector with the lightguide. The optical device also includes a spring mounted to the planar lightguide circuit chip for biasing the optical fiber into the alignment groove.

In one example, the alignment groove is a v-groove including fiber alignment surfaces that are angled relative to one another, and the spring is configured to bias the optical fiber into contact with the fiber alignment surfaces.

In one example, the lightguide is one of a plurality of lightguides defined by the core layer, the optical fiber is one of a plurality of optical fibers of the ferrule-less fiber optic connector, the v-groove is one of a plurality of v-grooves defined by the silicon substrate for aligning optical fibers of the ferrule-less fiber optic connector with the lightguides, and the spring is one of a plurality of springs for biasing the optical fibers into the v-grooves.

In one example, the planar lightguide circuit chip includes a main body and an extension that projects outwardly from the main body, and the v-groove or the v-grooves are defined on the extension. The extension can be a unitary portion of the silicon substrate.

In one example, the extension is configured to be received within a receiver of the fiber optic connector and cooperates with the receiver to guide the optical fibers into the fiber alignment grooves.

In one example, the planar lightguide circuit chip defines alignment pin openings for receiving alignment pins of the connector.

In one example, the spring includes a spring finger or the springs include spring fingers. The spring fingers preferably have a metal construction.

In one example, a metal sleeve mounts over the planar lightguide circuit chip. The metal sleeve includes a main sleeve body that wraps around the planar lightguide circuit chip. The spring fingers have base ends that are unitary with the metal sleeve and free ends that oppose the v-grooves.

In one example, the planar lightguide circuit chip includes a main body and an extension that projects outwardly from the main body, the fiber alignment grooves are defined on the extension, and the springs include the spring fingers including first segments that extend along a top side of the planar lightguide circuit chip, second segments that extend downwardly from the first segments toward the v-grooves, and third segments that extend over and along the v-grooves from the second segments to the free ends.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 3A is a front view of an example connection device adapted to be used with the fiber-optic assembly of FIG. 1.

FIG. 3B is a cross-sectional view of the connection device of FIG. 3A taken along section line 3B-3B.

FIG. 5 is a plan view of an example planar lightguide circuit chip suitable to be incorporated in the fiber-optic assembly of FIG. 1.

FIG. 6 is a side view of the planar lightguide circuit chip of FIG. 5.

DETAILED DESCRIPTION

Figure 1:
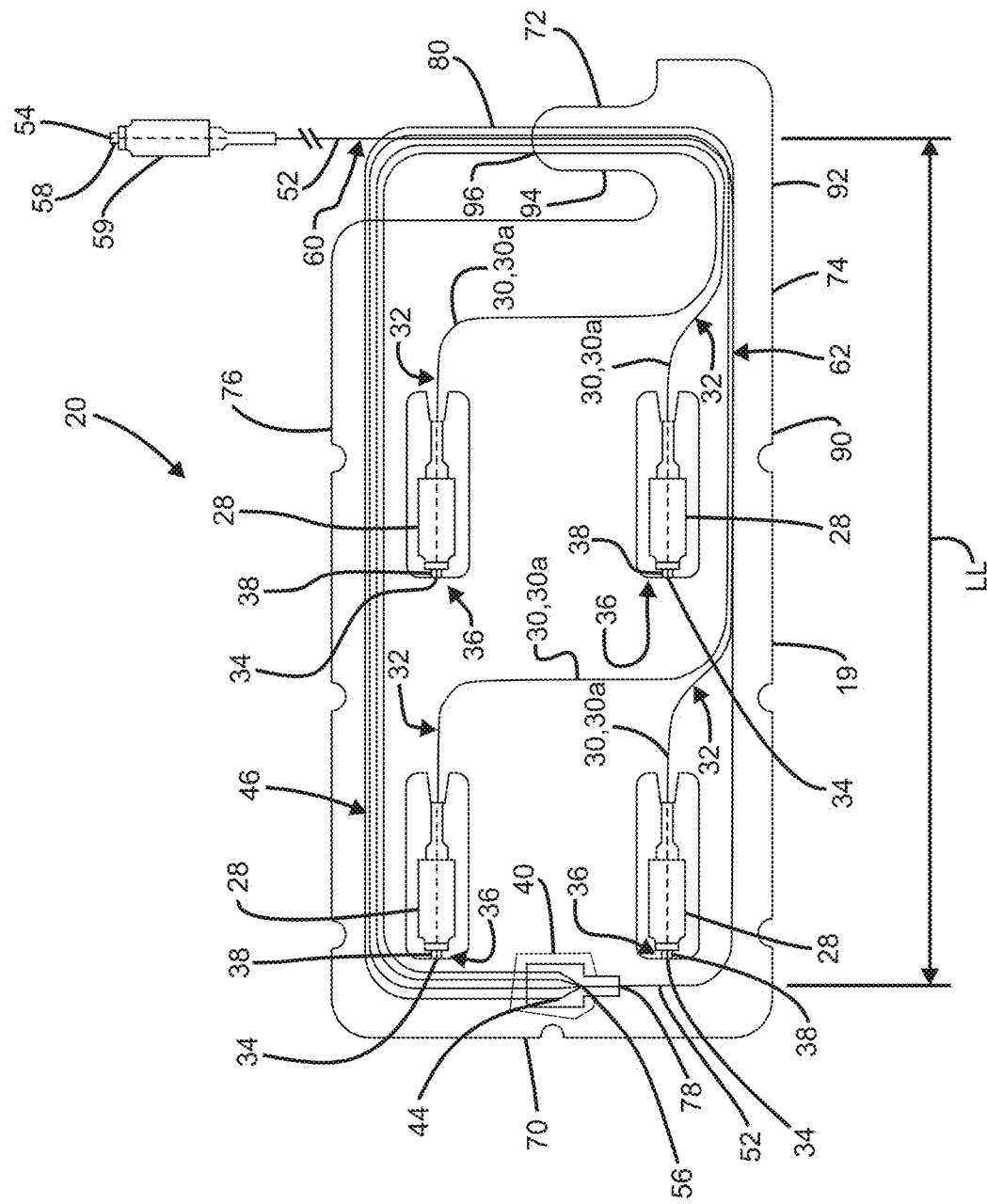
FIG. 1 depicts a fiber-optic assembly in accordance with the principles of the present disclosure.

Aspects of the present disclosure relate to fiber management arrangements for managing optical fibers for optical connection devices including optical connection locations. Aspects of the present disclosure also relate to methods for pre-manufacturing optical circuit layouts for use in optical connection devices. The circuit layouts can include optical fibers secured to a flexible substrate with the optical fibers being optically coupled to a planar lightguide circuit (PLC) chip by a splice-less configuration. In certain examples, the optical fibers can each define a splice-less optical path that extends from a fiber optic connector to the PLC chip. By pre-manufactured, it is meant that the optical circuit layouts are established before installation of the optical fibers in the optical connection devices. In certain examples, pre-manufacturing the optical circuit layouts allows the pre-manufactured fiber management arrangement to stage fiber optic connectors with respect to the arrangement of connection locations to facilitate the assembly process. In certain examples, optical circuit layouts are manufactured using pre-tested, pre-connectorized fiber optic pigtails that are routed on a substrate. In certain examples, the pre-connectorized fiber optic pigtails are robotically routed on a substrate using a robotic device. An example robotic fiber routing device is disclosed by U.S. Pat. No. 6,400,882, which is hereby incorporated by reference in its entirety. In certain examples, routing paths of the fiber optic pigtails are defined by a digital map accessed by a control system that controls movement of the robotic device. The control system can include one or more processors (e.g., digital processors) and memory for storing digital information (e.g., a digital map and control protocol for controlling operation of the robotic device). In certain examples, the substrates include flexible sheets including one or more layers that may include a polymeric film or other thin, sheet-like layer. Further details regarding fiber routing systems are described in PCT International Publication No. WO2021/217079, which is hereby incorporated by reference in its entirety.

In certain examples, optical circuit layouts are manufactured using optical fibers that are pre-processed and pre-tested before the optical fibers are routed on a substrate. In certain examples, the pre-processed optical fibers are robotically routed on a substrate using a robotic device in accordance with a layout specified by a digital map. The pre-processed optical fibers each have at least one pre-processed end (e.g., pre-connectorized, pre-ferrulized, pre-polished, pre-shaped with a laser or other non-contact energy source, etc.) that is processed before the optical fiber is routed on a substrate. In certain examples, the pre-processed optical fiber can be pre-connectorized with a full fiber optic connector (e.g., an SC fiber optic connector, an LC fiber optic connector, or other type of fiber optic connector such as a ferrule-less connector).

The optical fibers routed on the flexible substrate can be bare optical fibers (e.g., a fiber including a core and a cladding layer surrounding the core). However, for most applications, the portion of each optical fiber routed on the flexible substrate preferably is not bare and instead includes at least a coating layer (e.g., an acrylate layer) that surrounds and protects the cladding and core. The portion of an optical fiber bonded within a ferrule or used to provide a ferrule-less optical connection is typically a bare fiber (e.g., uncoated).

In the case where a full connector including a ferrule is used to provide connectorization, the optical fiber is ferrulized to the extent a ferrule is mounted at the end of the optical fiber. In other examples, the optical fiber can be processed in a lower cost manner by terminating the optical fiber with a reduced number of parts (e.g., only a ferrule, only a ferrule with a ferrule hub, etc.) such that the optical fiber is ferrulized without a full connector. In examples where bare fiber connection technology is used, the end of the fiber may be pre-processed by polishing and optionally shaping the end of the optical fiber without the use of a ferrule prior to routing the optical fiber on the substrate. Example bare fiber connection systems are disclosed by PCT International Publication Nos. WO 2012/112344; WO 2013/117598; WO 2016/043922; WO 2017/081306; and WO 2018/144128, which are incorporated by reference in their entireties.

FIG. 1 depicts a fiber optic assembly 20 in accordance with the principles of the present disclosure. The fiber optic assembly 20 is adapted to be mounted within a housing of an optical connection device such as the connection device depicted at FIGS. 3A and 3B. The connection device defines optical connection locations 26, and the fiber optic assembly 20 is adapted to stage fiber optic connectors 28 at positions corresponding to the connection locations 26.

Referring still to FIG. 1, the fiber optic assembly 20 includes a flexible substrate 19 (e.g., a sheet-like layer such as a polymeric film). The fiber optic assembly 20 also includes a plurality of first optical fibers 30 (e.g., coated optical fibers) having affixed segments 30a bonded to the flexible substrate 19 along fiber routing paths 32. The first optical fibers 30 have first ends 34 positioned at route termination locations 36. The route termination locations 36 are relatively arranged to correspond to the optical connection locations 26 of the optical connection device 24. The first ends 34 of the first optical fibers 30 have been processed to be suitable for making optical connections with other optical fibers. In the depicted example, the first ends 34 of the first optical fibers have been connectorized via the fiber optic connectors 28 (e.g., SC fiber optic connectors, LC fiber optic connectors, or other type of fiber optic connectors) and are supported within ferrules 38 of the connectors 28. End faces of the ferrules 38 and the first ends 34 are preferably polished.

The fiber optic assembly 20 also includes a planar lightguide circuit (PLC) chip 40 having lightguides 42 (see FIG. 5) optically connected to second ends 44 of the first optical fibers 30. First optical signal paths 46 are defined that extend continuously from the first ends 34 of the first optical fibers 30 through the second ends 44 of the first optical fibers to the lightguides 42 without any optical fiber splices being located along the first optical signal paths 46. In certain examples, the PLC chip 40 can provide splitting and/or filtering functionality. For example, the PLC chip can be a passive optical power splitter that evenly splits optical power or a tap power splitter that asymmetrically splits optical power.

In the depicted example, the PLC chip 40 provides splitter functionality (e.g., passive optical power splitting or signal tapping). The lightguides 42 include splitter output lightguides 42a optically coupled to a splitter input lightguide 42b by an optical splitting arrangement 50. A second optical fiber 52 is optically connected to the splitter input lightguide 42b. The second optical fiber 52 has a first end 54 and an opposite second end 56. The first end 54 of the second optical fiber 52 is a processed end which has been processed to be suitable for making an optical connection with other optical fibers. In the depicted example, the first end 54 is supported within a ferrule 58 of a fiber optic connector 59 (e.g., an SC fiber optic connector, LC fiber optic connector or other type of fiber optic connector) and has a polished end face. The second end 56 of the second optic fiber 52 is coupled to the splitter input lightguide 42*b*. A second optical signal path 60 is defined that extends continuously from the first end 54 of the second optical fiber 52 through the second end 56 of the second optical fiber 52 to the splitter input lightguide 42*b* without any optical fiber splices being located along the second optical signal path 60.

Referring to FIG. 1, the first optical fibers 30 and the second optical fiber 52 cooperate to define a fiber loop 62 that extends along a perimeter of the flexible substrate 19 around the route termination locations 36. The planar lightguide circuit chip 40 is positioned along the fiber loop 62 and is preferably secured (e.g., adhesively bonded, clamped, affixed, fastened, strapped, clipped, mechanically fixed, or otherwise secured either permanently or detachably) to the flexible substrate 19. In one example, at least a majority of the fiber loop 62 is formed by non-affixed segments 30*b* of the first optical fibers 30 and a non-affixed segment 52*b* of the second optical fiber 52 that are not bonded to the flexible substrate 19.

Figure 2:
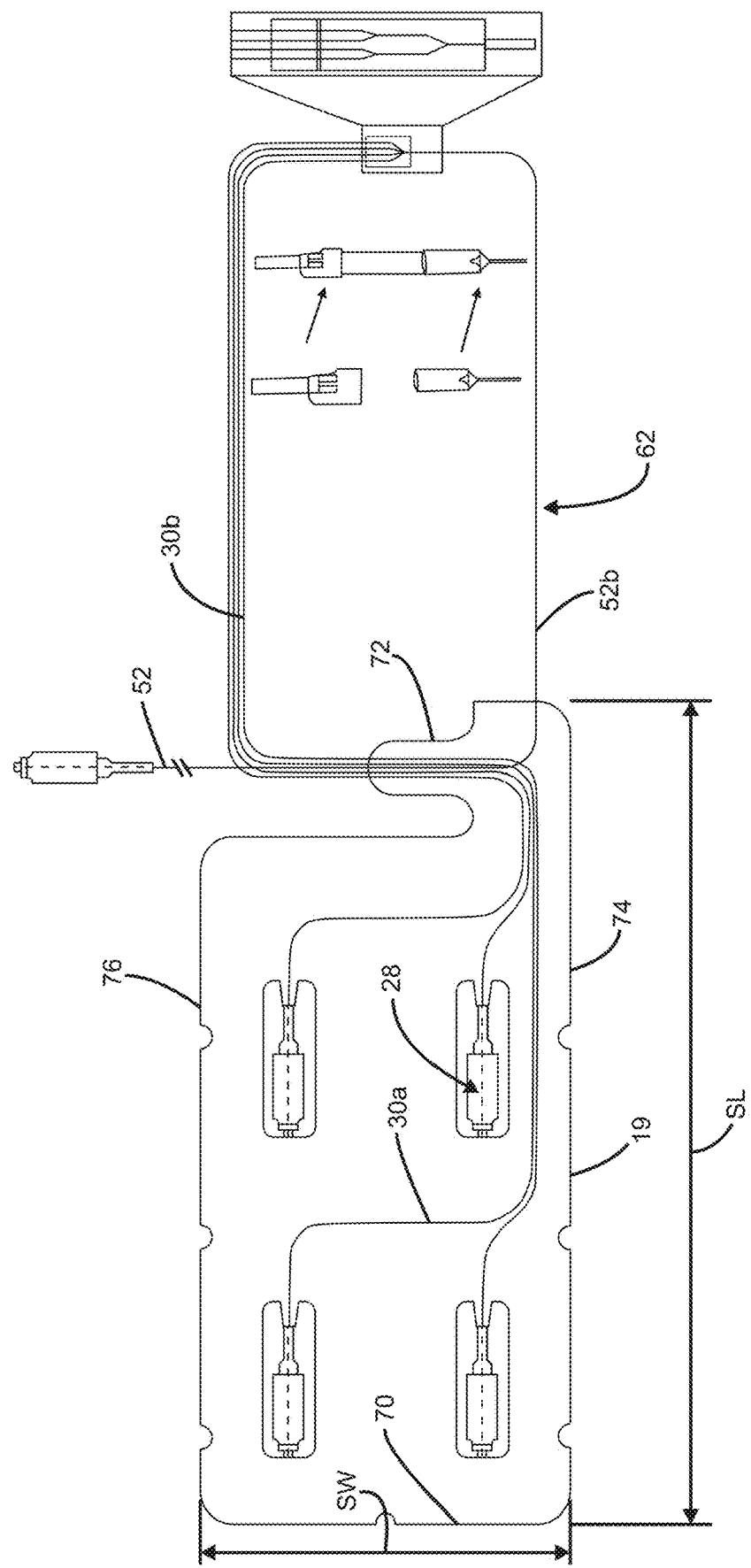
FIG. 2 depicts the fiber-optic assembly of FIG. 1 in the process of being manufactured.

Referring to FIG. 2, the flexible substrate 19 is elongate along a substrate length SL that extends between first and second substrate ends 70, 72. The flexible substrate 19 also includes a substrate width SW perpendicular to the substrate length SL that extends between first and second substrate sides 74, 76. The fiber loop 62 has a loop length LL that extends along the substrate length SL and first and second loop ends 78, 80 positioned respectively at the first and second substrate ends 70, 72. The PLC chip 40 is positioned at the first loop end 78 (e.g., at the first substrate end 70) and the first optical fibers 30 transition from the affixed segments 30*a* to the non-affixed segments 30*b* at the second loop end 80 (e.g., at the second substrate end 72).

The flexible substrate 19 includes a main body 90 and an extension 92 that projects outwardly from the main body 90 at the second substrate end 72 in a direction along the substrate length SL. The extension 92 is adjacent to the first substrate side 74. The flexible substrate 19 also includes a finger 94 that projects outwardly from the extension 92 along the substrate width SW in a direction toward the second substrate side 76. The affixed segments 30*a* of the first optical fibers 30 extend along a length of the finger 94 and transition from the affixed segments 30*a* to the non-affixed segments 30*b* at a free end 96 of the finger 94.

The second ends 44, 56 of the first and second optical fibers 30, 52 can be coupled to the lightguides of the planar lightguide circuit chip 40 by the use of v-groove blocks. The second ends 44, 56 of the optical fibers 30, 52 can be mounted within v-grooves of the v-groove blocks, and the v-groove blocks can be secured (e.g., adhesively bonded) to the PLC chip 40 with the ends of the optical fibers in co-axial alignment with corresponding ones of the lightguides of the PLC chip 40. The v-groove blocks can include main bodies including shelf portions for supporting coated portions of the optical fibers (e.g., fiber portions having a core surrounded by cladding which is surrounded by a polymeric coating such as acrylate) and alignment grooves such as v-grooves sized to receive bare fiber portions of the fibers (e.g., fiber portions having a core surrounded by a cladding and no coating). A cover can be bonded to the main body to secure the bare fiber portions in the v-grooves. A shape memory sleeve (e.g., a heat shrink sleeve) or other structure such as adhesive can be used to assist in securing the coated portions of the optical fibers at the shelf. In other examples, the fiber alignment grooves may include shapes having curvatures (e.g., semi-circular curvatures, arc-shaped curvatures) and the blocks may be referred to as groove blocks.

Referring to FIGS. 5-8, the second ends 44 of the first optical fibers 30 are co-axially aligned with the lightguides 42 through the use of a v-groove block 100 including a main body 102 and a cover 104. The v-groove block 100 is bonded to the PLC chip 40 at a precise location at which the second ends 44 of the first optical fibers 30 align with ends of the lightguides 42. The main body 102 defines a shelf portion 106 that supports coated portions of the optical fibers 30 and alignment grooves such as v-grooves 108 that receive bare fiber portions of the fibers 30. The cover 104 can be bonded to the main body to secure the bare fiber portions in the v-grooves 108. The v-grooves 108 are positioned to align the bare fiber portions of the fibers 30 with the splitter output lightguides 42*a*.

Referring to FIGS. 5, 6, 12, and 13, the second end 56 of the second optical fiber 52 is co-axially aligned with the splitter input lightguide 42*b* through the use of a v-groove block 120 including a main body 122 and a cover 124. The v-groove block 120 is bonded to the PLC chip 40 at a precise location at which the second end 56 of the second optical fiber 52 aligns with an end of the splitter input lightguide 42*b*. The main body 122 defines a shelf 126 that supports a coated portion of the second optical fiber 52 and an alignment groove such as a v-groove 128 that receives a bare fiber portion of the fiber 52. The cover 124 can be bonded to the main body 122 to secure the bare fiber portion of the fiber 52 in the v-groove 128. The v-groove 128 is positioned to align the bare fiber portion of the second optical fiber 52 with the splitter input lightguide 42*b*.

Planar lightguide circuit chips can be manufactured using wafer manufacturing technology in which lightguides are provided on a wafer substrate using techniques including deposition (e.g., chemical vapor deposition, flame hydrolysis deposition, etc.), patterning (e.g., lithographic patterning), and etching (e.g., reactive ion etching, inductively coupled plasma dry etching, etc.). After the lightguides have been provided on the wafer substrate, the wafer substrate can be diced to manufacture a plurality of planar lightguide circuit chips. Common materials used in the manufacture of PLC chips include silicon, silicon nitride, and silica. A typical configuration for a PLC chip includes a base layer, a first cladding layer deposited on the first cladding layer, a core layer deposited on the first cladding layer, and a second cladding layer deposited over the core layer. The core layer is typically patterned and etched to form a desired lightguide arrangement. In the case of a silica-on-silicon planar lightguide circuit chip, the base layer can include silicon, the core layer can include doped silica (e.g., germanium-doped silica), and the first and second cladding layers can include silicon dioxide. In the case of a silicon-on-insulator planar lightguide circuit chip, the base layer can include silicon, the core layer can include silicon, and the first and second cladding layers can include silicon dioxide. In the case of a silicon-nitride-on-insulator planar lightguide circuit chip, the base layer can include silicon, the core layer can include silicon nitride, and the first and second cladding layers can include silica.

Referring to FIGS. 5, 6, and 9-11, the PLC chip 40 includes base layer 200, a first cladding layer 202, a core layer 204, and a second cladding layer 206. In certain examples, the layers can be of the types described above. The input lightguide 42*b*, the optical splitting arrangement 50, and the output lightguides 42a are defined by optical light conveying structures (e.g., lightguide/waveguide structures) provided at the core layer 204.

Figure 14:
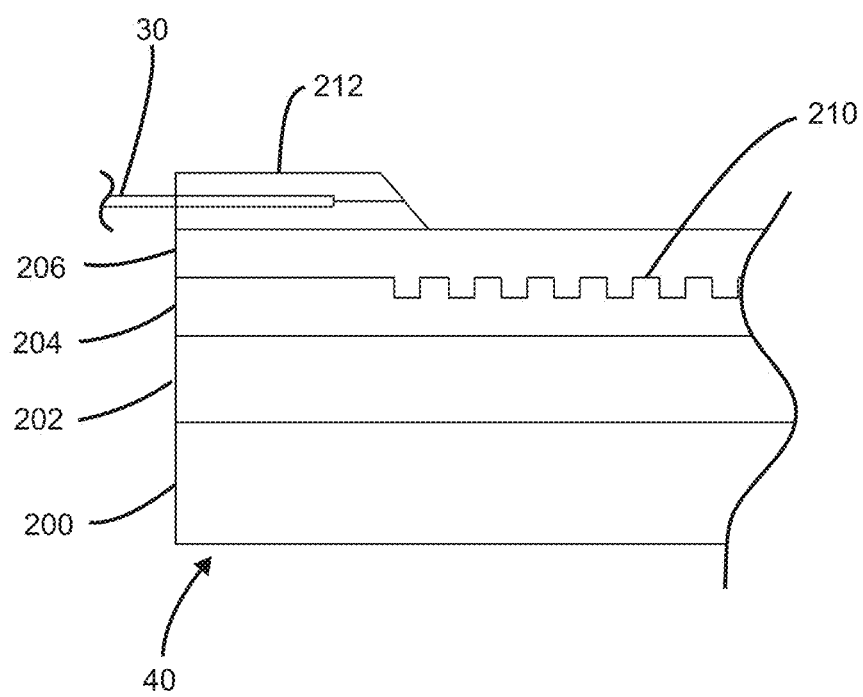
FIG. 14 is a schematic view showing an example photonic integrated circuit including a grating coupler configuration and also showing a v-groove block with an angled face suitable for optically connecting an optical fiber or optical fibers to the photonic integrated circuit through the grating coupler configuration.
Figure 15:
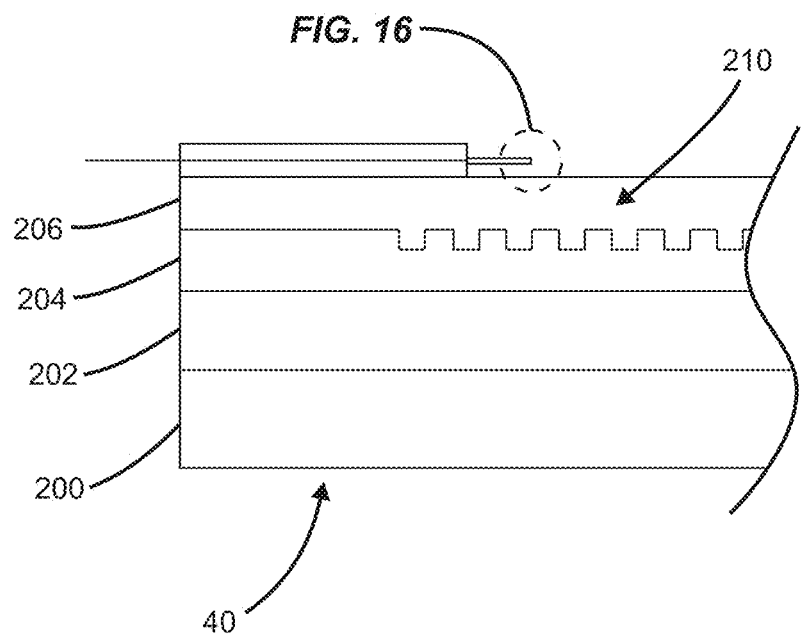
FIG. 15 is a schematic view showing an example photonic integrated circuit and grating coupler configuration of FIG. 14 in combination with a v-groove block supporting an optical fiber or fibers with an angled end face or faces suitable for optically connecting an optical fiber or fibers to the photonic integrated circuit through the grating coupler configuration.
Figure 16:
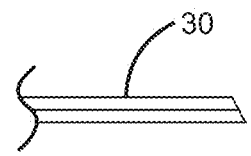
FIG. 16 is an enlarged view of the end portion the optical fiber of FIG. 15.
Figure 17:
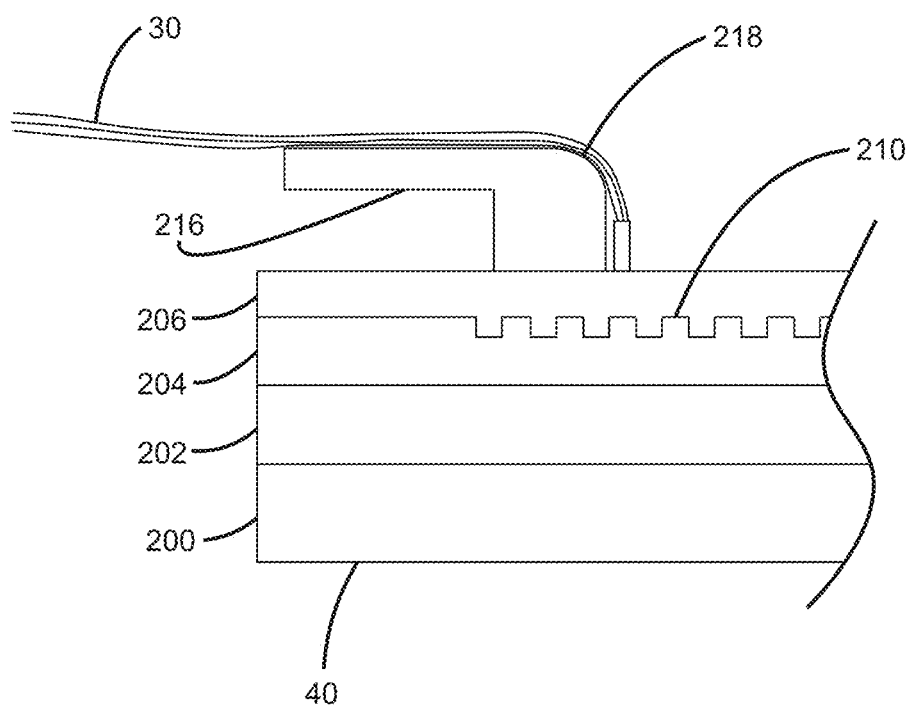
FIG. 17 is a schematic view showing an example photonic integrated circuit and grating coupler configuration of FIG. 14 in combination with a v-groove block providing vertical optical coupling of an optical fiber or fibers to the photonic integrated circuit through the grating coupler configuration.
Figure 18:
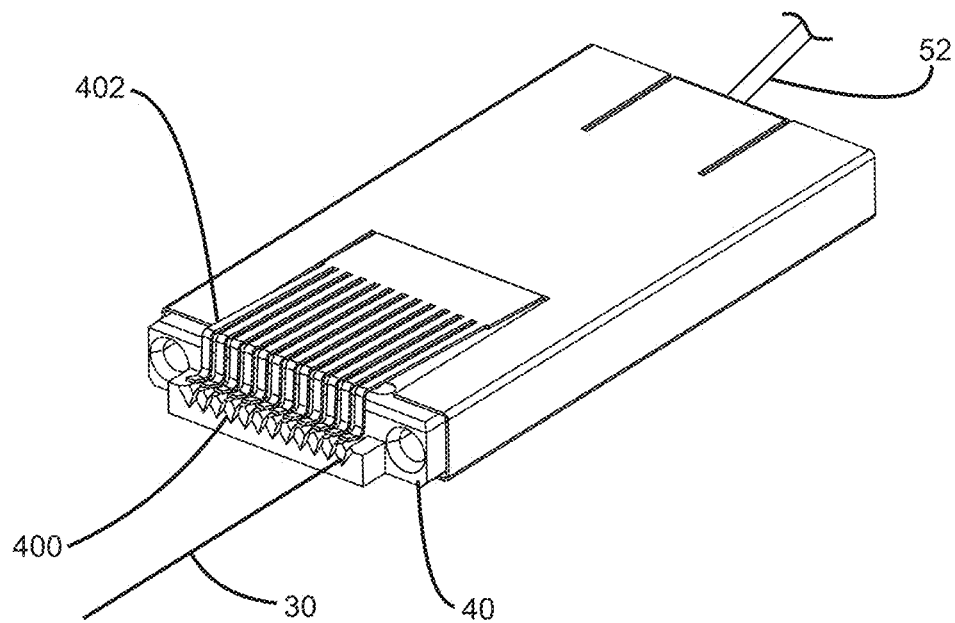
FIGS. 18-20 show the planar lightguide circuit chip of FIG. 5 modified to include an integrated fiber alignment and coupling interface.
Figure 19:
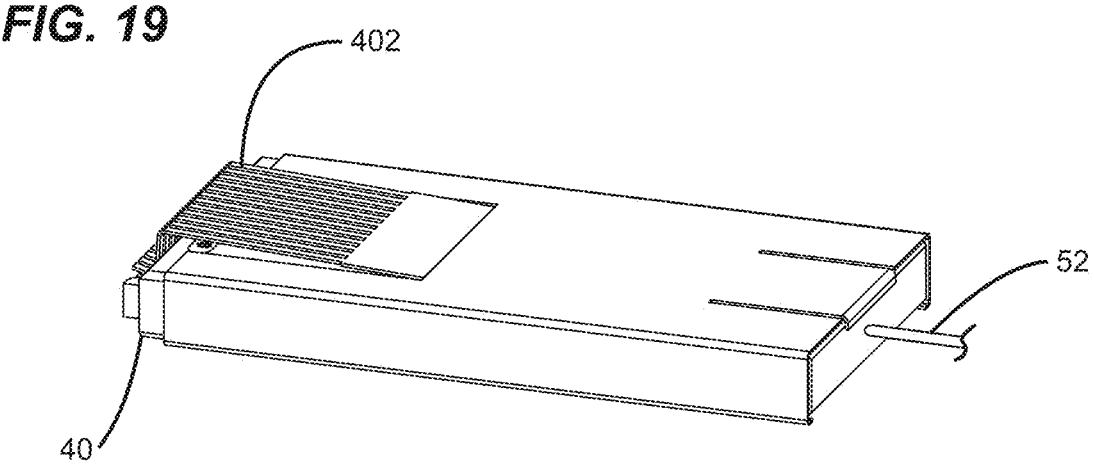
Figure 20:
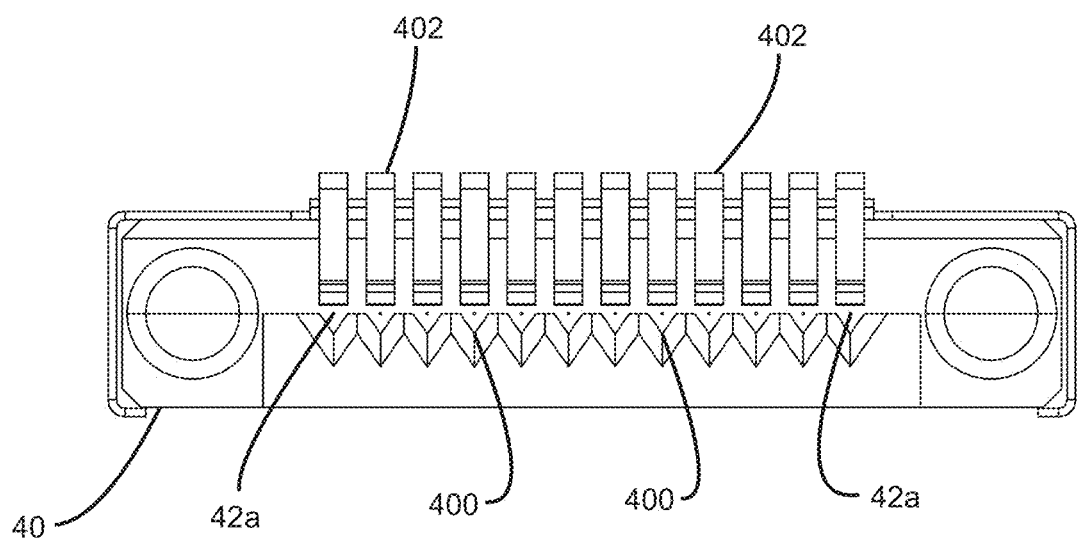
Figure 21:
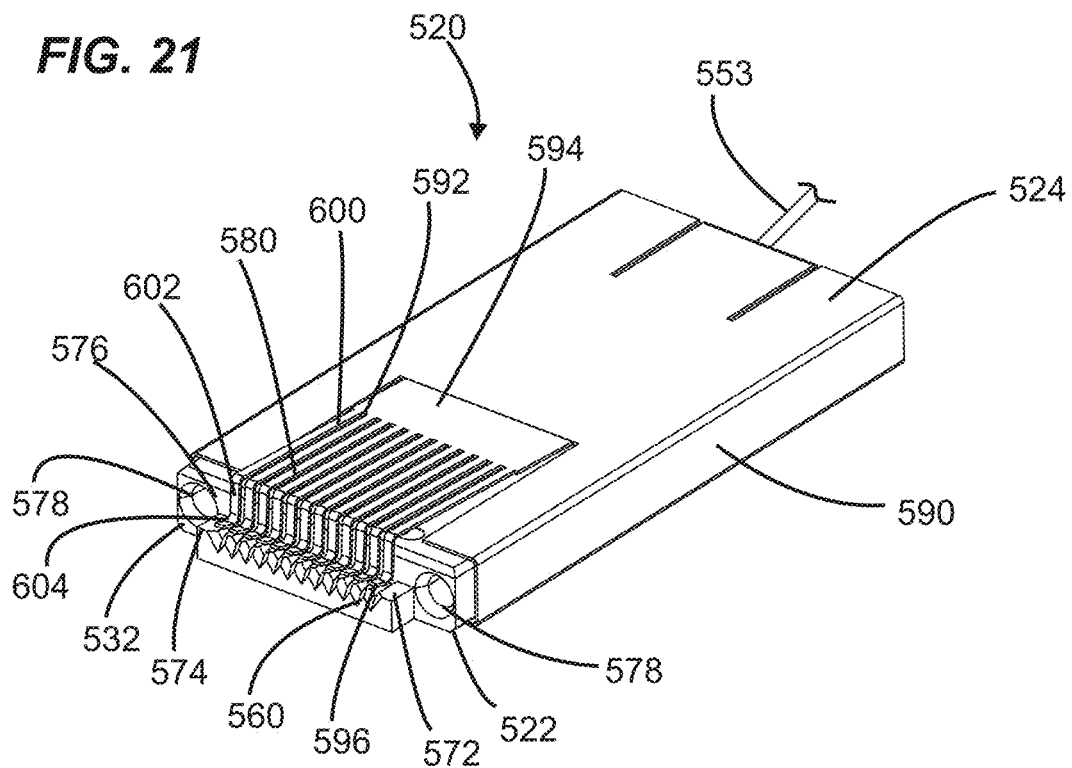
FIG. 21 is a perspective view of a planar lightguide circuit chip device in accordance with the principles of the present disclosure.
Figure 22:
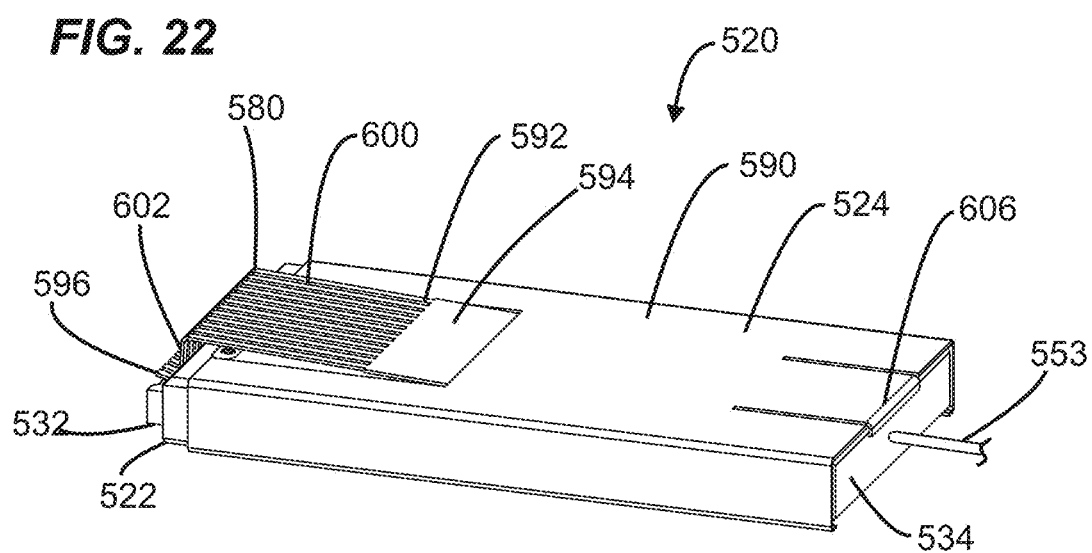
FIG. 22 is another perspective view of the planar lightguide circuit chip device of FIG. 21.

In certain examples, grating couplers can be etched into planar lightguide circuit chips to allow for coupling with external optical fibers. The grating couplers can have different types of configurations such as shallow etched configurations or fully etched configurations. The grating couplers can be covered by a cladding layer or the cladding layer can be omitted. FIGS. 14, 15, and 17 depict grating couplers 210 integrated with the PLC chip 40. At FIG. 14, the optical fibers 30 are supported by a v-groove block 212 with an end face of the block 212 and end faces of the fibers 30 angle polished (e.g., at a 45 degree angle) to cause light to be directed from the fibers 30 to the grating coupler 210. At FIG. 15, the optical fibers 30 are supported by a v-groove block 214 with ends of the optical fibers projecting beyond an end face of the block 214. End faces of the fibers 30 are angled (see FIG. 16) (e.g., via polishing or cutting such as laser cutting) to cause light to be directed from the fibers 30 to the grating coupler 210. At FIG. 17, the optical fibers 30 are supported by a v-groove block 216 with a curved section 218 adapted to turn the optical fibers such that the ends of the optical fibers face toward the grating coupler 210 to provide a vertical optical coupling. FIGS. 18-20 depict the PLC chip 40 modified to include an integrated fiber alignment interface including fiber alignment grooves 400 (e.g., v-grooves) defined by the base substrate 202 for aligning the optical fibers 30 with the splitter output lightguides 42a. The chip 40 also includes springs 402 for biasing bare fiber portions of the optical fibers 30 into the fiber alignment grooves 400.

During the process of making the fiber optic assembly 20, at least a majority of the fiber loop 62 can be positioned off the flexible substrate 19 to facilitate coupling the fibers 30, 52 to the PLC chip 40 (see FIG. 2). Once the fibers have been coupled to the PLC chip 40, the fiber loop 62 can be folded over onto the flexible substrate 19 to the position of FIG. 1, and the PLC chip 40 can be bonded to the substrate 19.

Fiber management arrangements including optical circuit layouts in accordance with the principles of the present disclosure can be incorporated in telecommunication enclosures. One example type of telecommunication enclosures includes a multi-service terminal (MST). An MST is an enclosure that is commonly installed near the outer edge of a fiber optic network to provide optical connection locations for connecting subscribers to the fiber optic network. A typical MST is an enclosure having a plurality of hardened fiber optic adapter ports that are accessible from outside the enclosure. The hardened fiber optic adapter ports are often arranged in an array and are adapted to receive hardened fiber optic connectors terminating the ends of drop cables. A drop cable is typically routed from a port of an MST to a subscriber location. For example, the drop cable can be routed from the MST to an optical network terminal (ONT) at the subscriber location such that service is provided to the ONT via an optical line coupled to the fiber optic network.

FIGS. 3A and 3B depict an example connection device in the form of an MST 320 in which a fiber optic assembly in accordance with the principles of the present disclosure can be used to provide fiber management and to simplify assembly operations. The MST 320 includes a housing 322 that is preferably environmentally sealed. A plurality of fiber optic connection locations defined by hardened fiber optic adapters 326 (see FIG. 4) are carried with the housing 322. Each of the hardened fiber optic adapters 326 includes a hardened outer port 328 accessible from outside the housing 322, and a non-hardened inner port 330 accessible from an interior of the housing 322. The hardened outer ports 328 can be closed by exterior plugs when not in use. A fiber optic cable 334 is routed into the interior of the housing 322. The fiber optic cable 334 can include the second optical fiber 52 that is coupled to the input lightguide 42a of the planar lightguide circuit chip 40.

Figure 4:
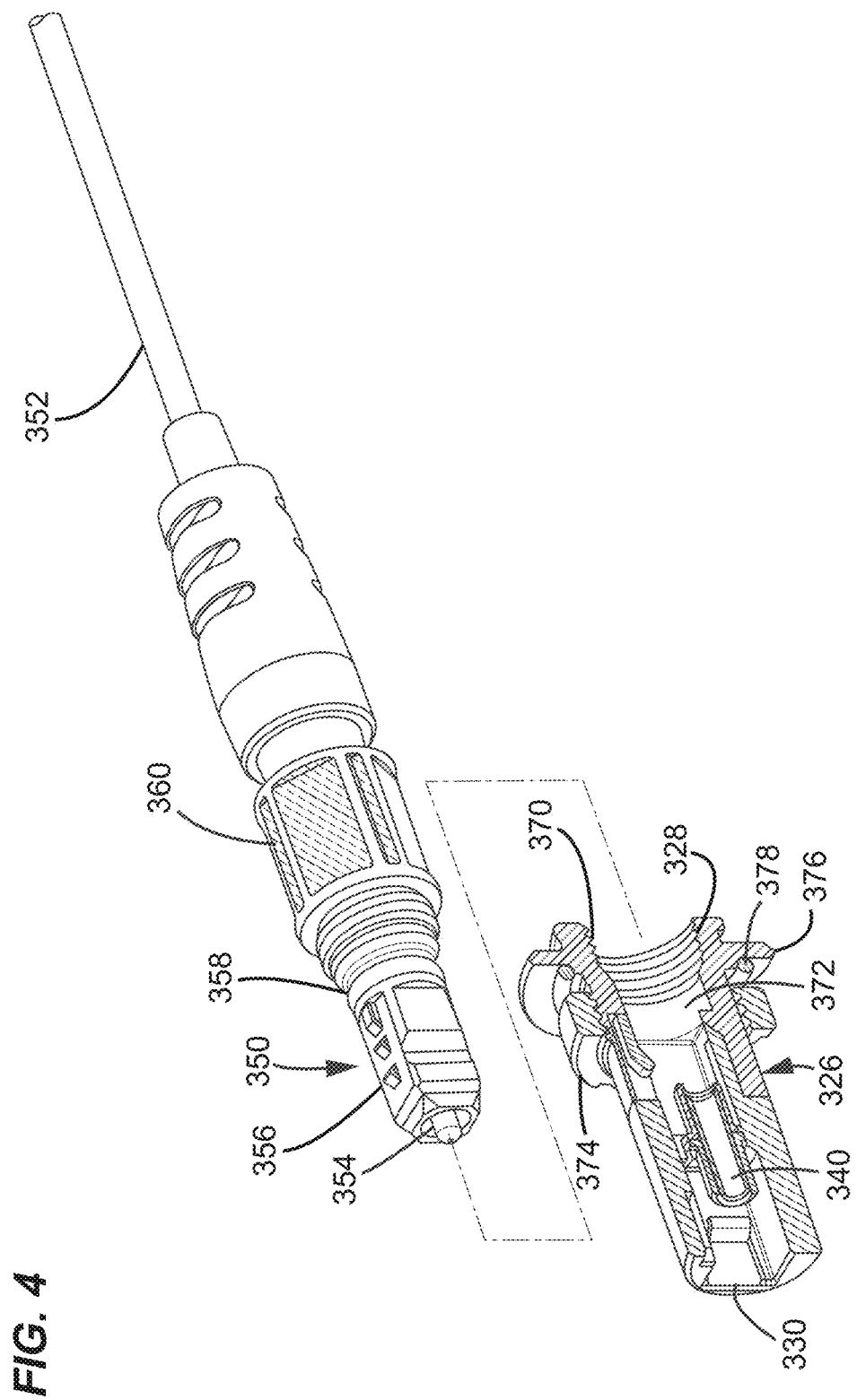
FIG. 4 depicts a hardened fiber-optic adapter suitable for use with the connection device of FIG. 3A and also depicts a corresponding hardened fiber optic connector adapted to be received within the hardened fiber-optic adapter.
Figure 7:
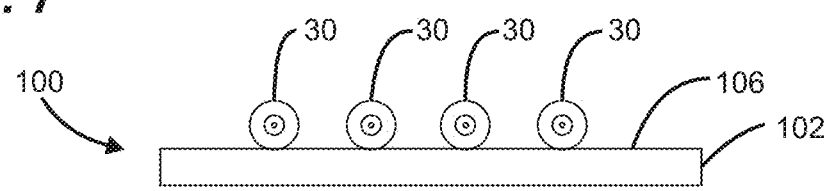
FIG. 7 is a cross-sectional view taken along section line 7-7 of FIG. 5.
Figure 8:
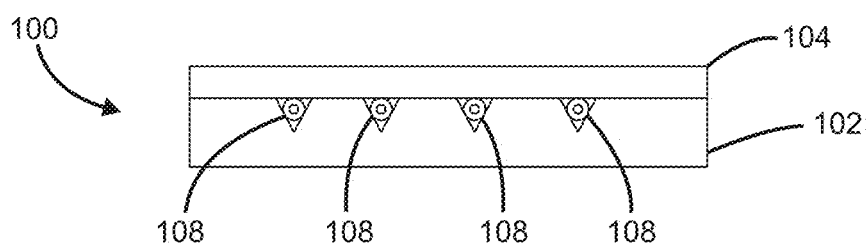
FIG. 8 is a cross-sectional view taken along section line 8-8 of FIG. 5.
Figure 9:
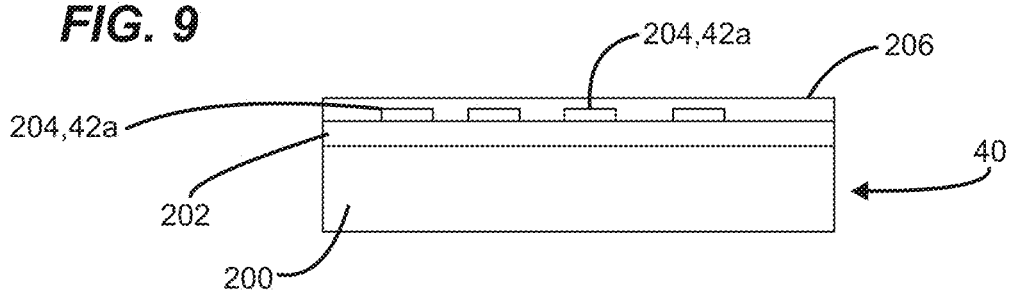
FIG. 9 is a cross-sectional view taken along section line 9-9 of FIG. 5.
Figure 10:
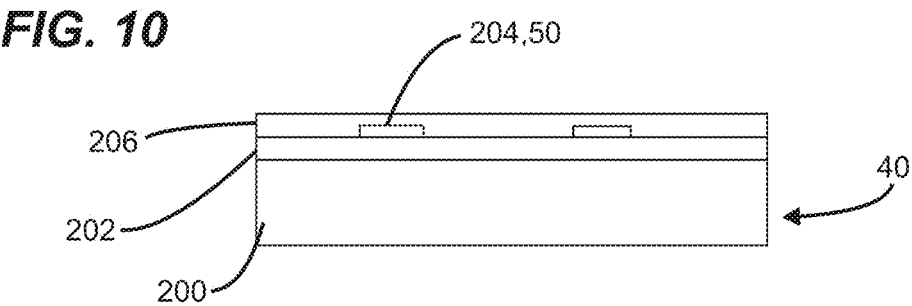
FIG. 10 is a cross-sectional view taken along section line 10-10 of FIG. 5.
Figure 11:
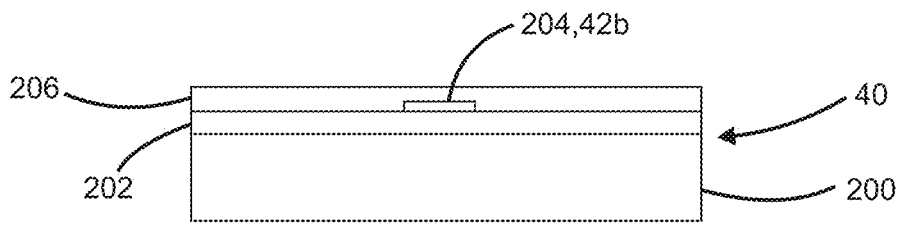
FIG. 11 is a cross-sectional view taken along section line 11-11 of FIG. 5.
Figure 12:
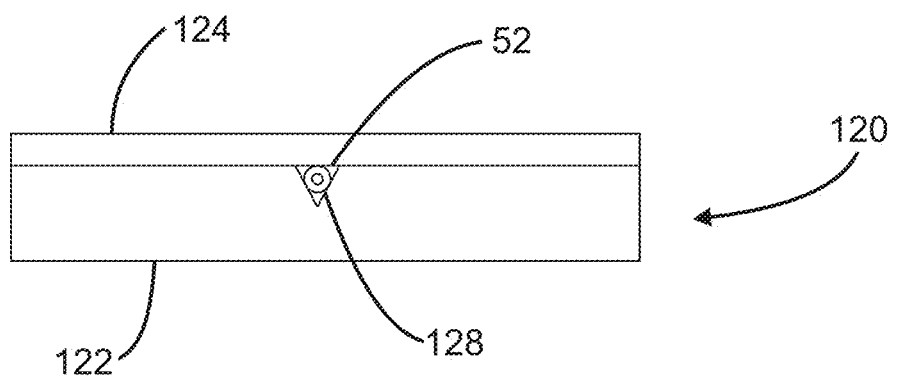
FIG. 12 is a cross-sectional view taken along section line 12-12 of FIG. 5.
Figure 13:
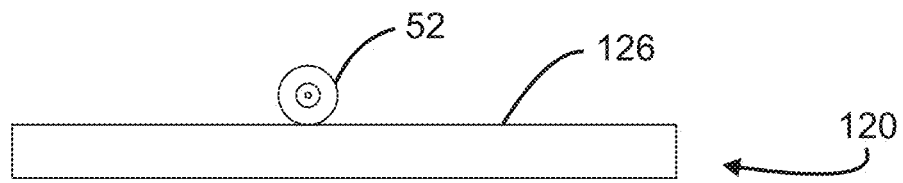
FIG. 13 is a cross-sectional view taken along section line 13-13 of FIG. 5.

As shown at FIG. 4, each of the hardened fiber optic adapters 326 includes a ferrule alignment sleeve 340 for receiving and aligning the ferrules of two fiber optic connectors desired to be coupled together (e.g., one of the fiber optic connectors 28 and an exterior hardened connector 350) that may correspond to a drop cable. It will be appreciated that the ferrules support the ends of optical fibers that are coaxially aligned when the ferrules of the connectors are aligned within the ferrule alignment sleeve 340. An example MST is described in U.S. Pat. No. 7,512,304, which is hereby incorporated by reference in its entirety.

FIG. 4 also depicts an example one of the fiber optic connectors 350 adapted to mate with one of the hardened outer ports 328 of the MST 320. The hardened fiber optic connector 350 is depicted coupled to a drop cable 352. The hardened fiber optic connector 350 includes a ferrule 354 for supporting the end of an optical fiber of the drop cable 352. The ferrule 354 is mounted at the end of a connector body 356 adapted to be received within one of the hardened outer ports 328 of the hardened fiber optic adapters 326. In certain examples, the hardened fiber optic connector 350 includes an environmental seal 358 and a turn-to-secure fastener 360. In the depicted example, the turn-to-secure fastener 360 includes threads, but alternatively could include a bayonet connection interface or another interface that interlocks by a turning action. In other examples, a slide interlock can be used. The hardened outer port 328 includes internal threads 370 and a sealing surface 372. Further details of the fiber optic connector 350 are provided in U.S. Pat. No. 7,744,288, which is hereby incorporated by reference in its entirety.

When the hardened fiber optic connector 350 is installed in the hardened outer port 328 of the fiber optic adapter 326, the ferrule 354 is received within the ferrule alignment sleeve 340, the environmental seal 358 seals against the sealing surface 372, and external threads of the turn-to-secure fastener 360 engage with the internal threads 370 of the fiber optic adapter 326 to retain the hardened fiber optic connector 350 within the hardened outer port 328. In certain examples, the fiber optic adapter 326 can be secured within an opening of an enclosure by a nut 374 with a wall of the enclosure being captured between the nut 374 and a flange 376. An environmental seal 378 can provide sealing between the flange 376 and the enclosure wall. In other examples, the hardened fiber optic connector can be latched within the hardened outer port using a slide-lock or a flexible latch.

It will be appreciated that the MST 320 can be readily used to interconnect subscribers to a fiber optic network. Each of the hardened fiber optic adapters 326 represents a connection port for coupling a subscriber to the network. To connect a subscriber to the network, a plug of one of the hardened fiber optic adapters 326 is removed to expose the hardened outer port 328. A fiber optic drop cable connectorized by a hardened fiber optic connection is then coupled to the network by inserting the hardened fiber optic connector 350 into the hardened outer port 328. Upon installation of the hardened fiber optic connector 350 in the hardened outer port 328, a fiber of the drop cable 352 is optically connected to a corresponding optical fiber of the fiber optic cable 334. For example, the hardened optical connector 350 installed within the hardened outer port 328 connects with a corresponding non-hardened fiber optic connector 28 installed within the inner port 330 of the hardened fiber optic adapter to couple the drop line to the network.

Additional aspects of the present disclosure relate to fiber alignment systems for aligning optical fibers with lightguides (i.e., waveguides, cores, optical pathways, etc.) of a planar lightguide circuit chip. In one example, the alignment system is integrated with the planar lightguide circuit chip and includes at least one fiber alignment v-groove and at least one spring for biasing an optical fiber against fiber alignment surfaces of the fiber alignment v-groove.

Figure 29:
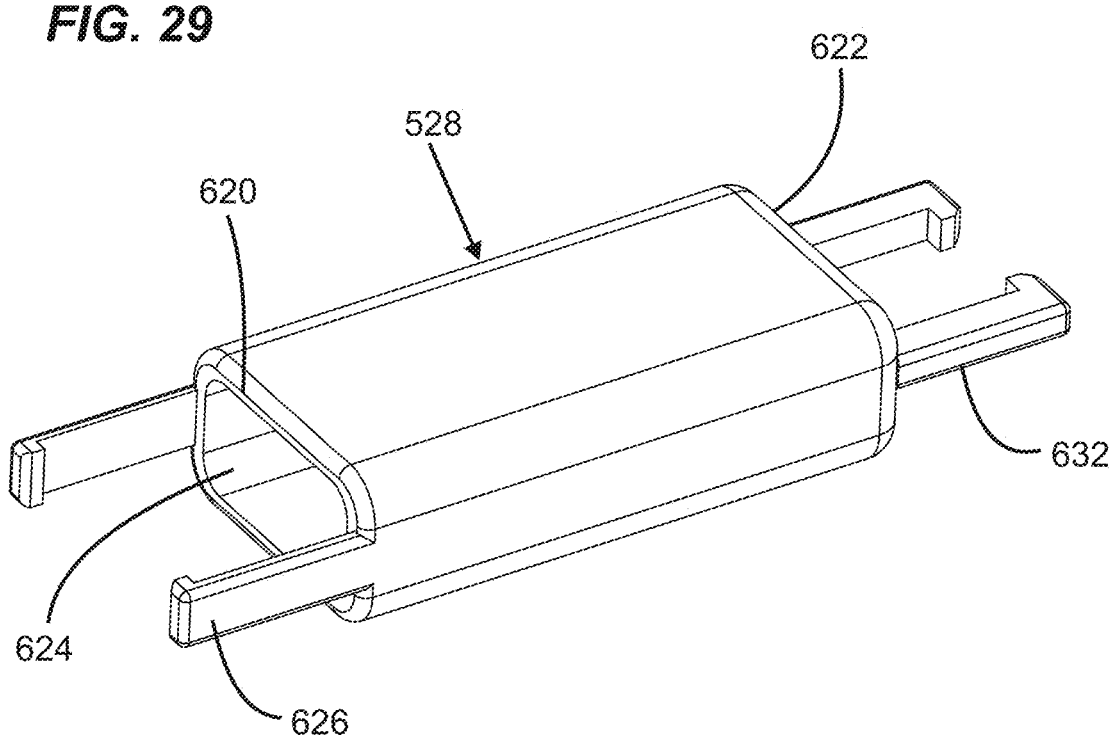
FIG. 29 is a perspective view of an example fiber optic adapter configured for coupling the planar lightguide circuit chip device of FIG. 21 with a bare-fiber optical connector.
Figure 30:
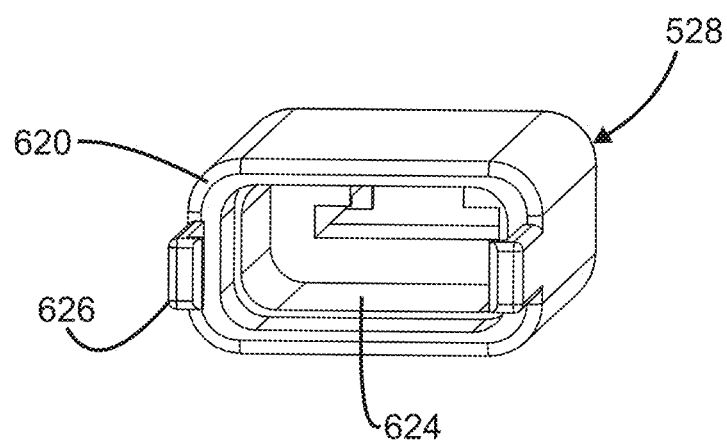
FIG. 30 is another perspective view of the fiber optic adapter of FIG. 29.
Figure 31:
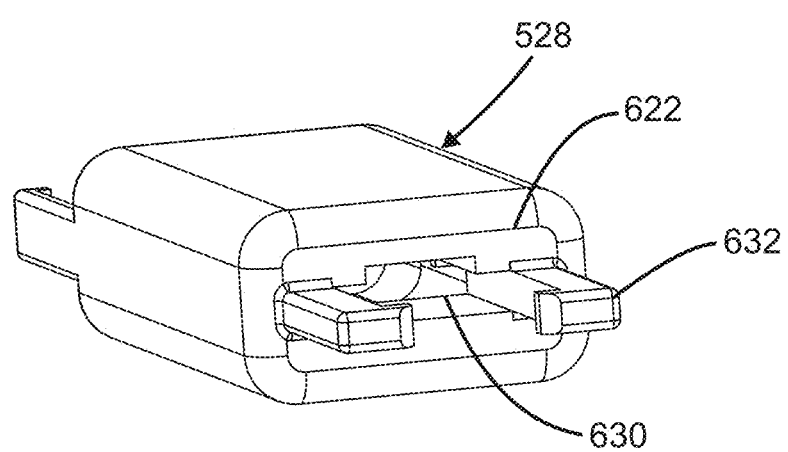
FIG. 31 is still another perspective view of the fiber-optic adapter of FIG. 29.
Figure 32:
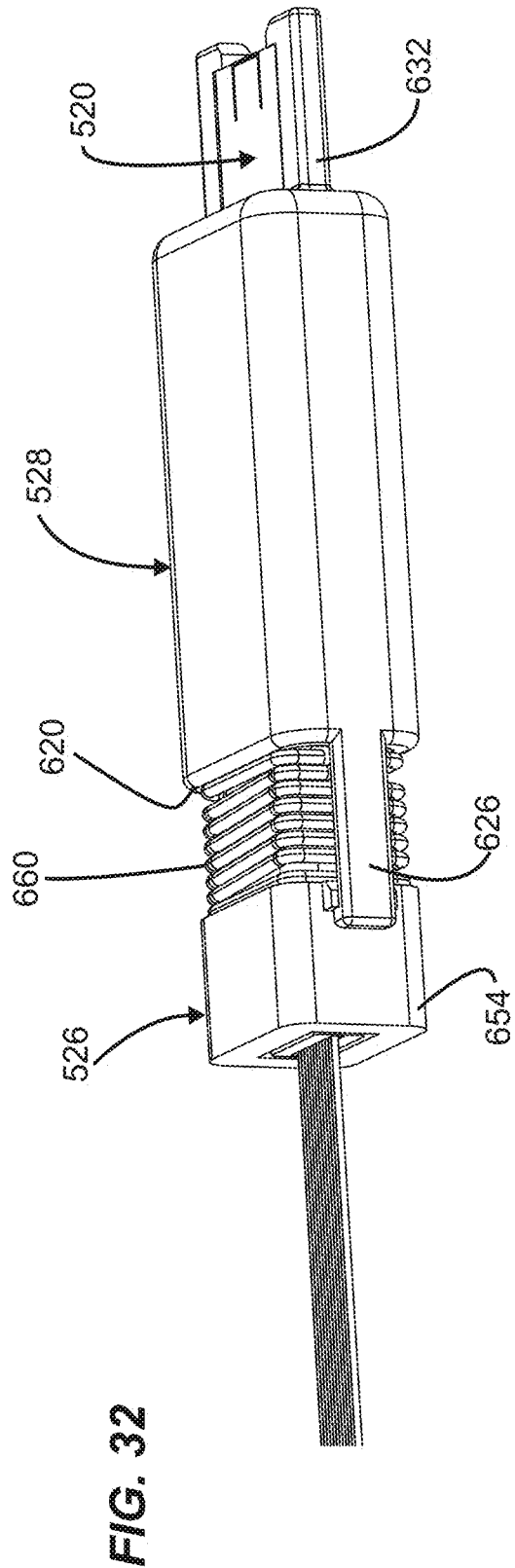
FIG. 32 is a perspective view showing the planar lightguide circuit chip device of FIG. 21 coupled to a bare-fiber optical connector by the fiber optic adapter of FIGS. 29-31.
Figure 33:
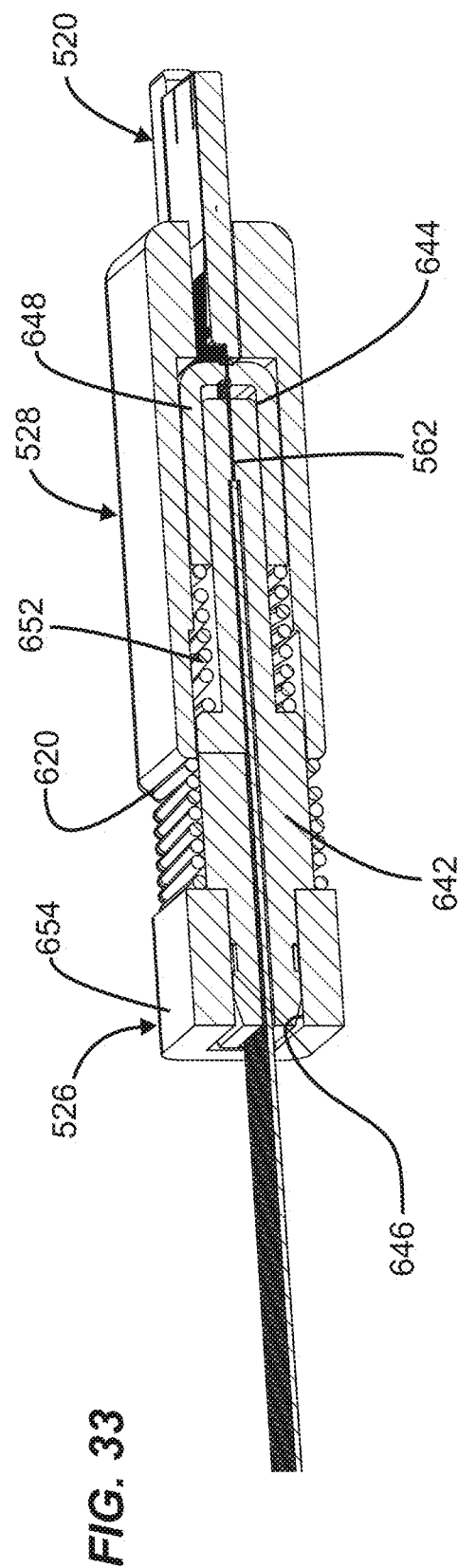
FIG. 33 is a cross-sectional view taken along a vertical reference plane cut longitudinally through the assembly of FIG. 32.
Figure 34:
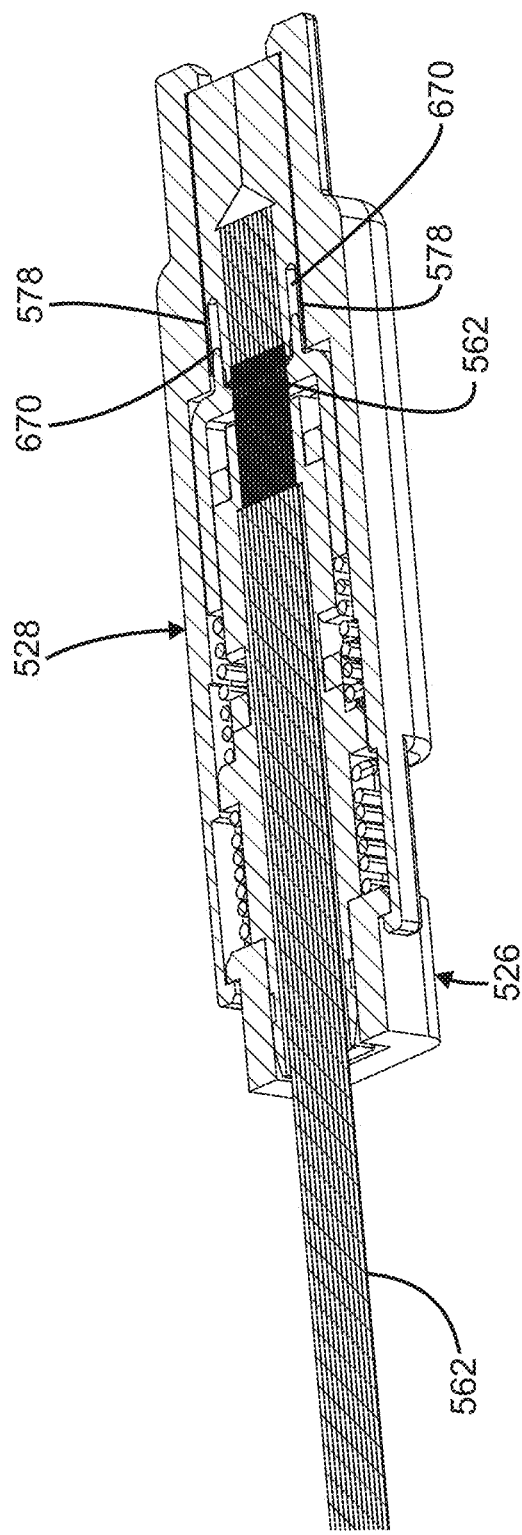
FIG. 34 is a cross-sectional view taken along a horizontal reference plane cut longitudinally through the assembly of FIG. 32.
Figure 35:
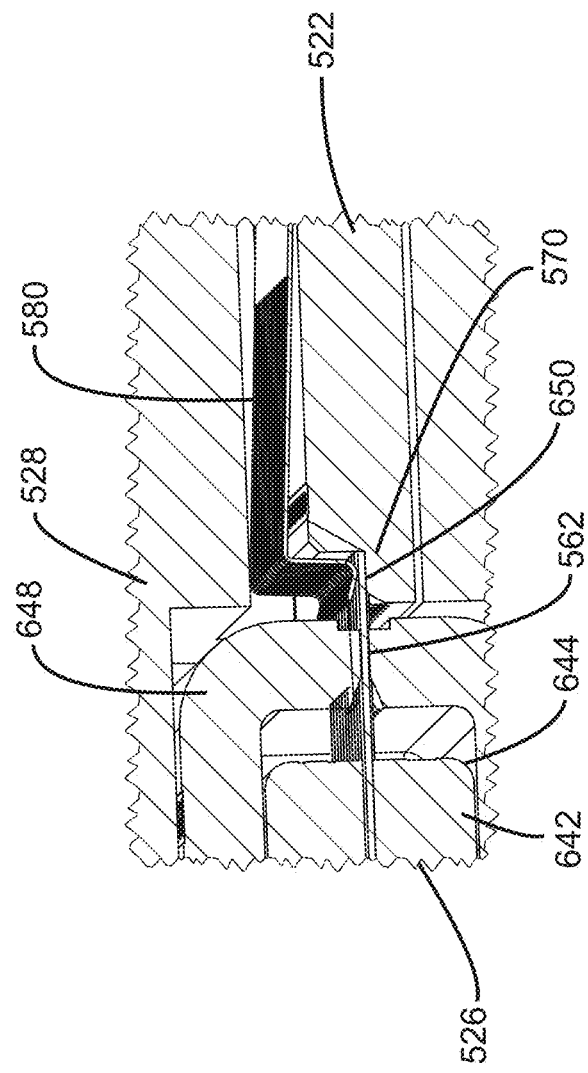
FIG. 35 is an enlarged view of a portion of FIG. 33.

FIGS. 21-28 depict an optical device 520 in accordance with the principles of the present disclosure. The optical device 520 includes a planar lightguide circuit chip 522 and a spring sleeve 524 that mounts on the PLC chip 522. The optical device 520 is configured to mate and de-mate with respect to a corresponding bare-fiber optical connector 526 (see FIGS. 32-35) with the assistance of a fiber-optic adapter 528 (see FIGS. 29-31). In certain examples, the optical device 520 can be optically coupled to the bare-fiber optical connector 526 in the field without the use of an optical splice, and also can be de-coupled from the bare-fiber optical connector 526.

Figure 25:
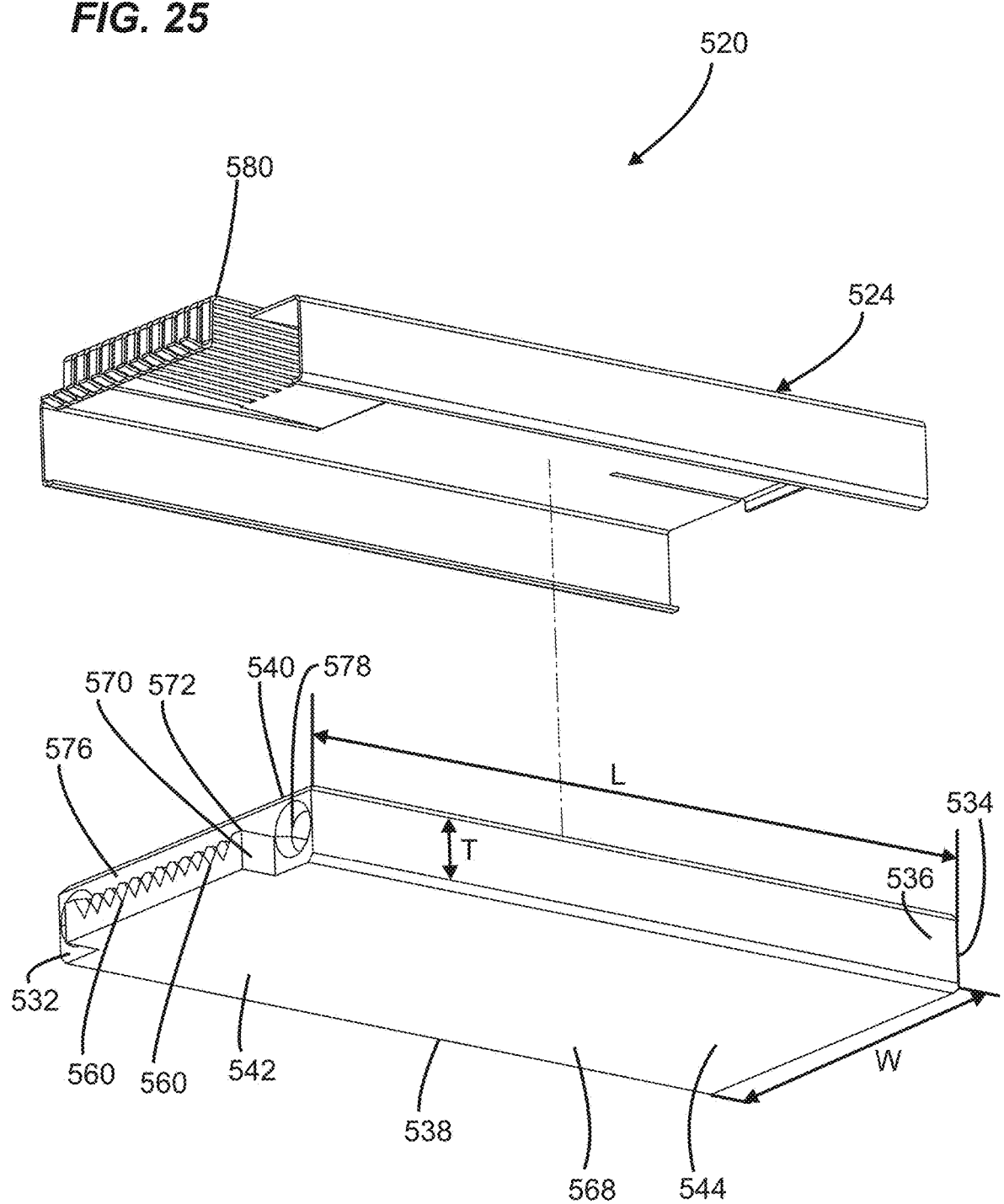
FIG. 25 is an exploded view of the planar lightguide circuit chip device of FIG. 21.
Figure 26:
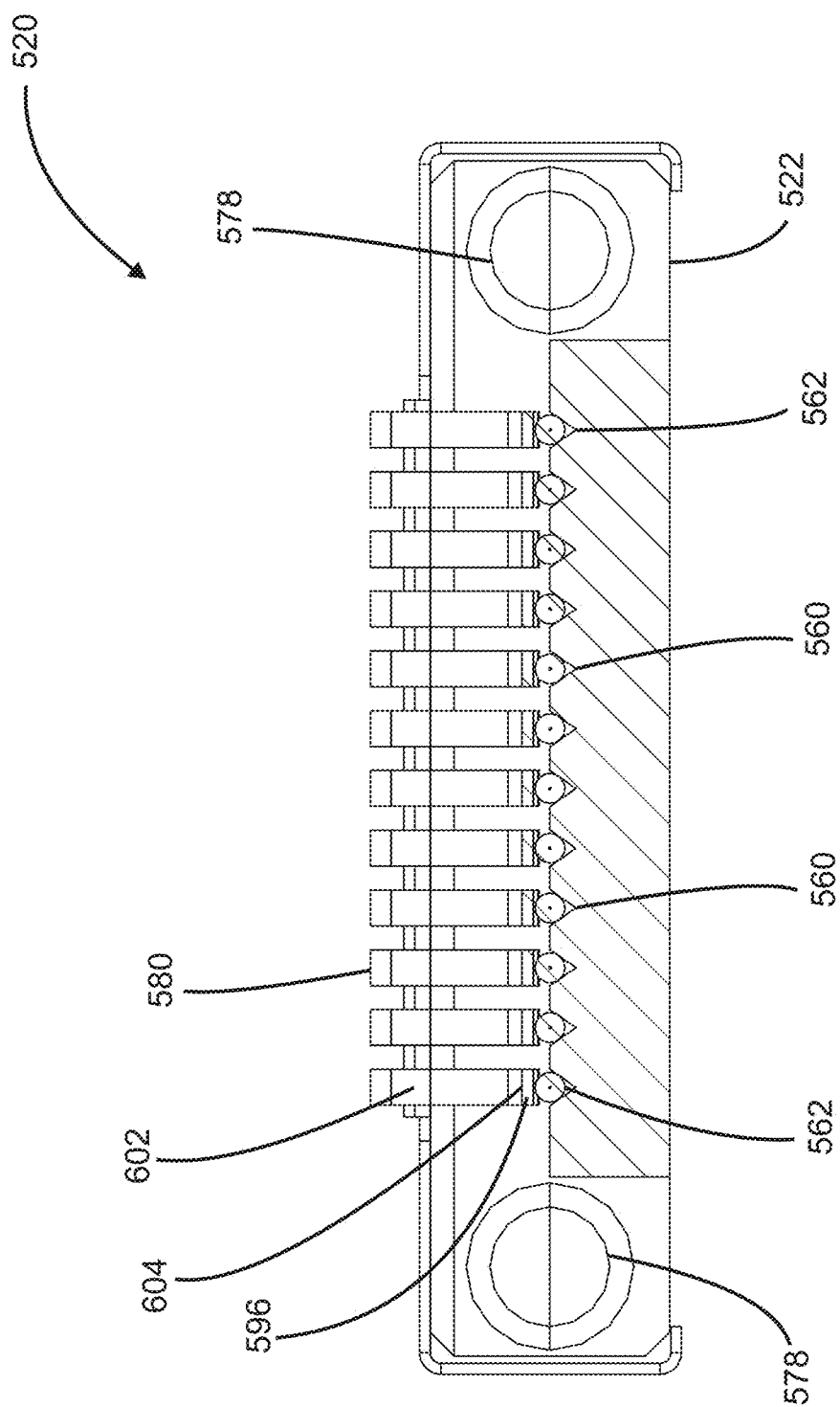
FIG. 26 is a cross-sectional view taken along section line 6-6 of FIG. 24.
Figure 28:
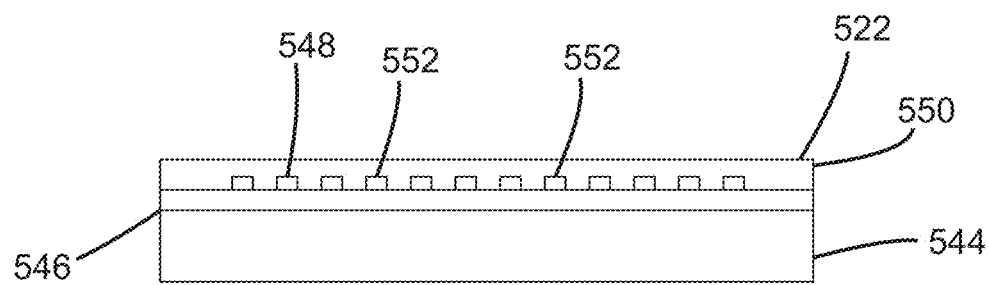
FIG. 28 is a cross-sectional view taken along section line 14-14 of FIG. 27.

Referring to FIG. 25, the planar lightguide circuit chip 522 includes a length L that extends between first and second opposite ends 532, 534. The PLC chip 522 also includes a width W perpendicular to the length L, and a thickness T that is perpendicular to both the length L and the width W. The width W extends between opposite first and second sides 536, 538 of the PLC chip 522 and the thickness T extends between main top and bottom sides 540, 542 of the PLC chip 522. Referring to FIG. 28, the PLC chip 522 includes a base substrate 544 that, in a preferred example, is made of a material having a composition including a silicon. Still referring to FIG. 28, the PLC chip 522 also includes a first cladding layer 546 deposited on the base substrate 544, a core layer 548 deposited on the first cladding layer 546, and a second cladding layer 550 deposited over the core layer 548. In one example, the first and second cladding layers 546, 550 are made of a material having a composition including silicon dioxide, and the core layer 548 is made of a material having a composition including doped silica. In a preferred example, the core layer 548 includes a plurality of lightguides 552 adapted for conveying light via total internal reflection.

In alternative examples, the base substrate 544, the cladding layers 546, 550, and the core layer 548 can be made of materials having other compositions (e.g., compositions such as those described above or other compositions). In a preferred example, the materials are selected such that, through the cooperation of the core layer and the cladding layers, light can be conveyed through lightguides of the core layer by total internal reflection. In certain examples, the base substrate 544 is constructed of material in which fiber alignment structures such as alignment grooves (e.g., v-grooves) can be formed (e.g., by etching or other techniques).

Figure 27:
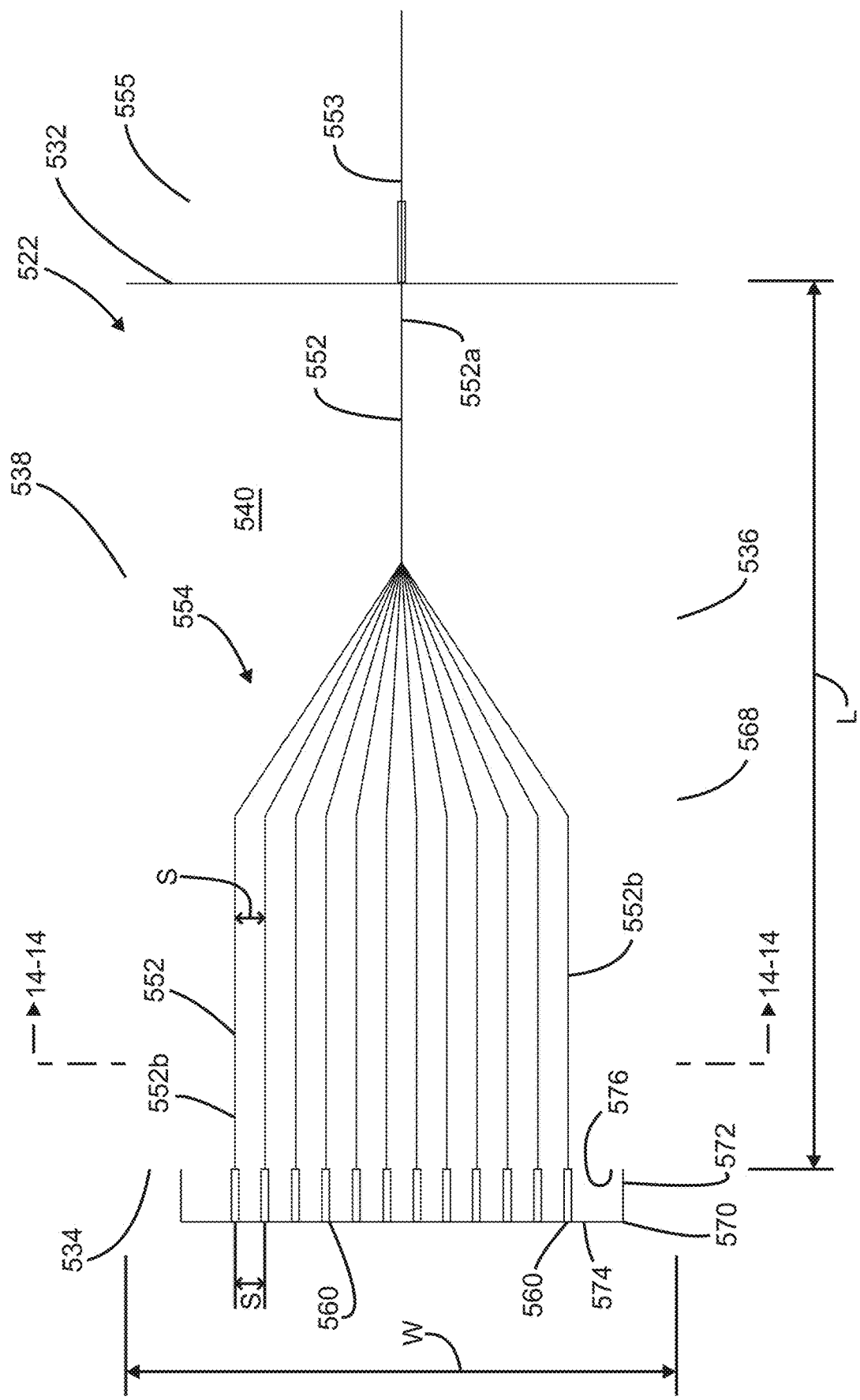
FIG. 27 is a schematic plan view of the planar lightguide circuit chip device of FIG. 21.

Referring to FIG. 27, the lightguides 552 of the PLC chip 522 are configured to provide the PLC chip 522 with passive optical power splitting functionality. For example, the PLC chip 522 has a passive optical power splitting region 554 positioned between a splitter input lightguide 552a and a plurality of splitter output lightguides 552b. The splitter input lightguide 552a extends from the first end 532 of the PLC chip 522 to the splitting region 554 and the splitter output lightguides 552b extend from the splitting region 554 to the second end 534 of the PLC chip 522. The output lightguides 552b can be arranged in a row with the lightguides 552b spaced apart from one another in accordance with a center-to-center spacing S. It will be appreciated that lightguides 552b are spaced apart from one another across the width W of the planar lightguide circuit chip 522. In other examples, the PLC chip 522 can be provided with other types of optical functionalities such as signal tapping functionality, asymmetrical power splitting functionality, optical wavelength filtering functionality, and wavelength division multiplexing functionality. In the depicted example, an optical fiber 553 (e.g., an input fiber) is optically coupled to the splitter input lightguide 552a at the first end 532 of the PLC chip 522. In one example, the optical connection can be provided via a grating coupler and/or by a v-groove block 555 bonded to the first end 532 of the PLC chip 522 which supports the optical fiber 553 in alignment with the splitter input lightguide 552a.

Figure 23:
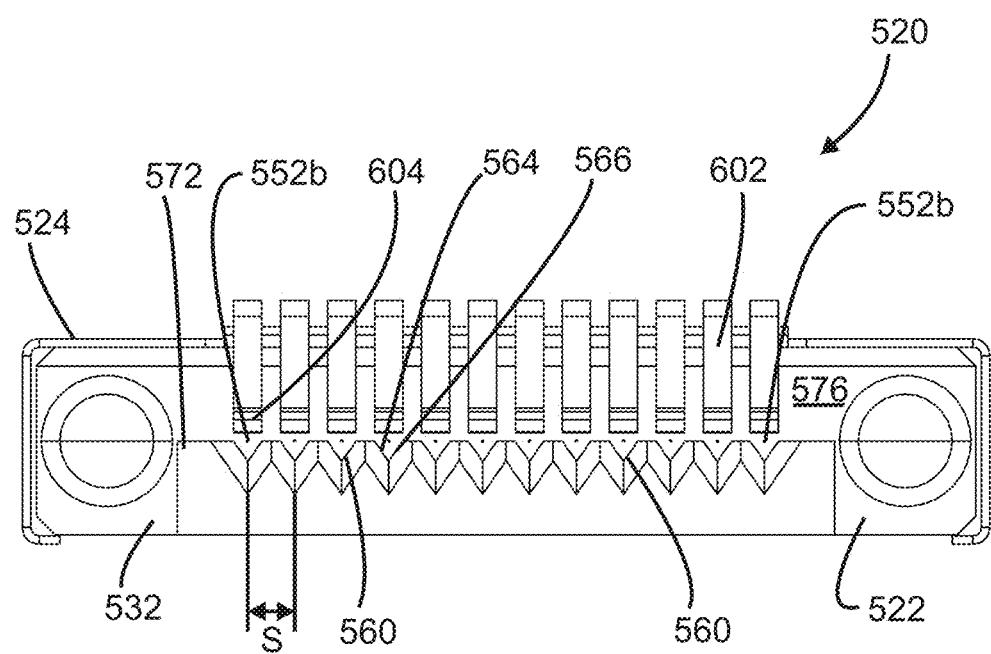
FIG. 23 is an end view of the planar lightguide circuit chip device of FIG. 21.
Figure 24:
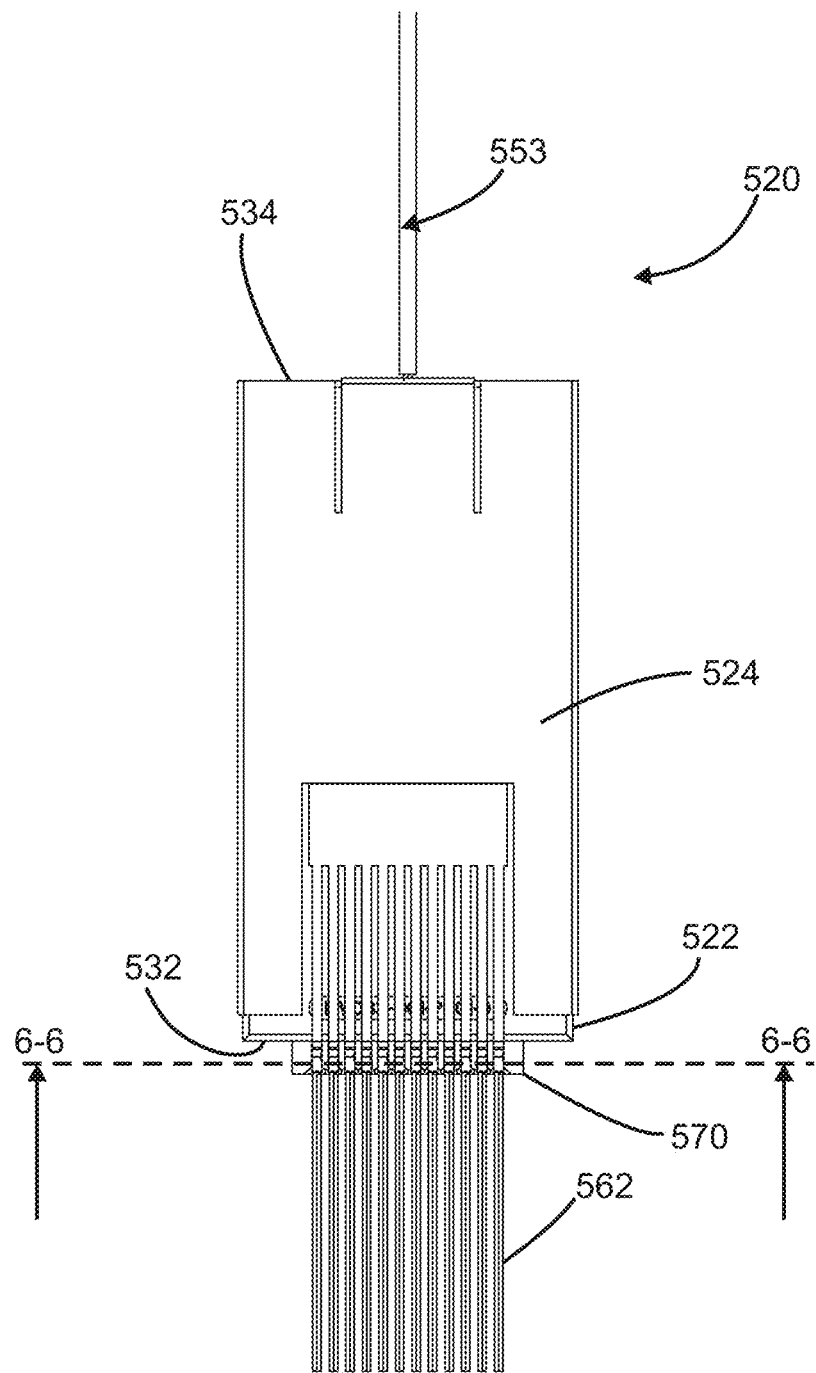
FIG. 24 is a top view of the planar lightguide circuit chip device of FIG. 21.

Referring to FIGS. 23 and 25, the planar lightguide circuit chip 522 includes a plurality of fiber alignment grooves 560 for aligning optical fibers 562 of the bare-fiber optical connector 526 with the splitter output lightguides 552b of the PLC chip 522. In the depicted example, the fiber alignment grooves 560 are arranged in a row and are relatively positioned with the same center-to-center spacing S as the splitter output lightguides 552b. In a preferred example, the fiber alignment grooves 560 are v-grooves each having first and second fiber alignment surfaces 564, 566 that are angled relative to one another. In other examples, the alignment grooves may have other configurations such as curved (e.g., arc-shaped, semicircular-shaped) or U-shaped configurations. In the depicted example, each fiber alignment groove 560 is positioned to co-axially align one of the optical fibers 562 of the optical connector 526 with a corresponding one of the splitter output lightguides 552b.

As shown at FIG. 25, the planar lightguide circuit chip 522 includes a main body 568 and an extension 570 that projects outwardly from the main body 568 at the second end 534 of the PLC chip 522. The fiber alignment grooves 560 are defined at a top side 572 of the extension 570 that is stepped down from the main top side 540 of the PLC chip 522. The fiber alignment grooves 560 are arranged in a row that extend across the width W of the PLC chip 522. In the depicted example, the alignment grooves 560 have lengths that extend in an orientation along the length L of the PLC chip 522 from an outer edge 574 of the extension 570 to an end face 576 of the PLC chip 522 at which the splitter output lightguides 552b terminate. In one example, end faces of the lightguides 552b co-axially align with the alignment grooves 560 and oppose ends of the alignment grooves 560 located at the end face 576 of the PLC chip 522. In one example, the extension 570 is a unitary portion of the base substrate 544. In the depicted example, the PLC chip 522 also defines alignment pin openings 578 at the end face 576. The alignment pin openings 578 extend into the planar lightguide circuit chip 522 in a direction extending from the end face 576 along the length L of the PLC chip 522 towards the first end 532 of the PLC chip 522. The extension 570 is positioned between the alignment pin openings 578.

The optical device 520 also includes fiber biasing springs 580 that, in the depicted example, are unitary early integrated with the spring sleeve 524. The fiber biasing springs 580 are configured for biasing the optical fibers 562 of the optical connector 526 into the fiber alignment grooves 560. In one example, the fiber biasing springs 580 are adapted for biasing the optical fibers 562 into contact with the first and second fiber alignment surfaces 564, 566 of the fiber alignment grooves 560. In the depicted example, a separate biasing spring 580 is provided above each of the fiber alignment grooves 560 so as to oppose an open top side of the corresponding fiber alignment groove 560. In other examples, a given biasing spring 580 may correspond to more than one fiber alignment groove 560. For example, in an alternative embodiment, each of the biasing springs may correspond to two of the fiber alignment grooves 560. Of course, other configurations are also possible.

In the depicted example, the spring sleeve 524 includes a main body 590 that extends over the main top side 540 of the planar lightguide circuit chip 522 and wraps around the first and second sides 536, 538 of the planar lightguide circuit chip 522 to the main bottom side 542 of the planar lightguide circuit chip 522. In a preferred example, the spring sleeve 524 has a metal construction. In the depicted example, the biasing springs 580 are constructed as spring fingers having cantilevered configurations. Base ends 592 of the biasing springs 580 are unitary formed with a base tab 594 of the spring sleeve 524. Free ends 596 of the fiber biasing springs 580 are positioned over corresponding ones of the fiber alignment grooves 560. Each of the fiber biasing springs 580 includes a first segment 600 that extends from the base end 592 along the main top side 540 of the PLC chip 522 to the end face 576, a second segment 602 that extends downwardly from the first segment 600 along the end face 576 of the PLC chip 522 toward the top side 572 of the extension 570, and a third segment 604 that extends from the second segment 602 along the alignment groove 560 to the free end 596. The spring sleeve 524 also includes a latch 606 that opposes the first end 532 of the PLC chip 522. The main body of the PLC chip 522 is captured between the second segments 602 of the springs 580 and the latch 606.

Referring to FIGS. 29-35, the fiber-optic adapter 528 includes a first end 620 and an opposite second end 622. The first end 620 includes a connector port 624 for receiving the optical connector 526 and a latch arrangement 626 for retaining the optical connector 526 within the port 624. The second end 622 includes an optical device mounting port 628 including a mounting region 630 at which the optical device 520 can be secured with the assistance of a latching arrangement 632. With the optical device 520 secured at the mounting region 630, the optical connector 526 can be optically coupled to the lightguides 552 of the optical device 520 by installing the optical connector 526 within the connector port 624. As the optical connector 526 is inserted into the connector port 624, the optical fibers 562 of the optical connector 526 are directed into the fiber alignment grooves 560 which guide the optical fibers 562 into coaxial alignment with the lightguides 552 (e.g., into alignment with the ends of the splitter output lightguides 552b). As the optical fibers 562 are inserted into the fiber alignment grooves 560, the fiber biasing springs 580 press the optical fibers 562 into the fiber alignment grooves 560 to ensure proper coaxial alignment between the optical fibers 562 and the lightguides 552.

Referring to FIGS. 32-35, the bare-fiber optical connector 526 includes a connector body 642 through which the optical fibers 562 extend and to which the optical fibers 562 are secured (e.g., adhesively secured). The connector body 642 includes a front end 644 and a rear end 646. A retractable shroud 648 of the optical connector 526 is mounted at the front end 644. The retractable shroud 648 is movable relative to the connector body 642 between an extended position and a retracted position. When the shroud 648 is in the extended position, bare fiber portions 650 of the optical fibers 562 are protected within the shroud 648. When the shroud 648 is in the retracted position (see FIGS. 33-35), the bare fiber portions 650 project forwardly beyond the shroud 648 so as to be capable of being inserted into the fiber alignment grooves 560. During insertion of the connector 526 into the connector port 624, the shroud 648 engages a stop (e.g., an end face of the optical device or a stop defined by the adapter) to cause retraction of the shroud concurrent with the insertion of the optical connector 526 into the connector port 624.

The connector 526 further includes a spring 652 for biasing the shroud 648 toward the extended position. The connector 526 also includes a rear piece 654 having catches 656 for engaging the latching arrangement (i.e., latch arms) 626 to secure the optical connector 526 within the port 624. The rear piece 654 retains a spring 660 on the connector body 642. When the optical connector 526 is inserted into the connector port 624, the spring 660 is compressed between the rear piece 654 and the first end 620 of the fiber-optic adapter 528 to bias the catches 656 against catches of the latch arms 626.

A bare fiber portion of an optical fiber includes a core surrounded by a cladding layer with no coating provided over the cladding layer. In certain examples, the bare fiber portions 650 project at least 2, 3, 4, 5, or 6 mm forwardly beyond the shroud 648 when the shroud is retracted.

In the depicted example, the shroud 648 includes alignment pins 670 that project forwardly from the shroud 648. When the optical connector 526 is inserted into the connector port 624 of the fiber-optic adapter 528, the alignment pins 670 are received within the alignment pin openings 578 of the optical device 520 to assist in pre-aligning the optical fibers 562 with their corresponding fiber alignment grooves 560.

Figure 36:
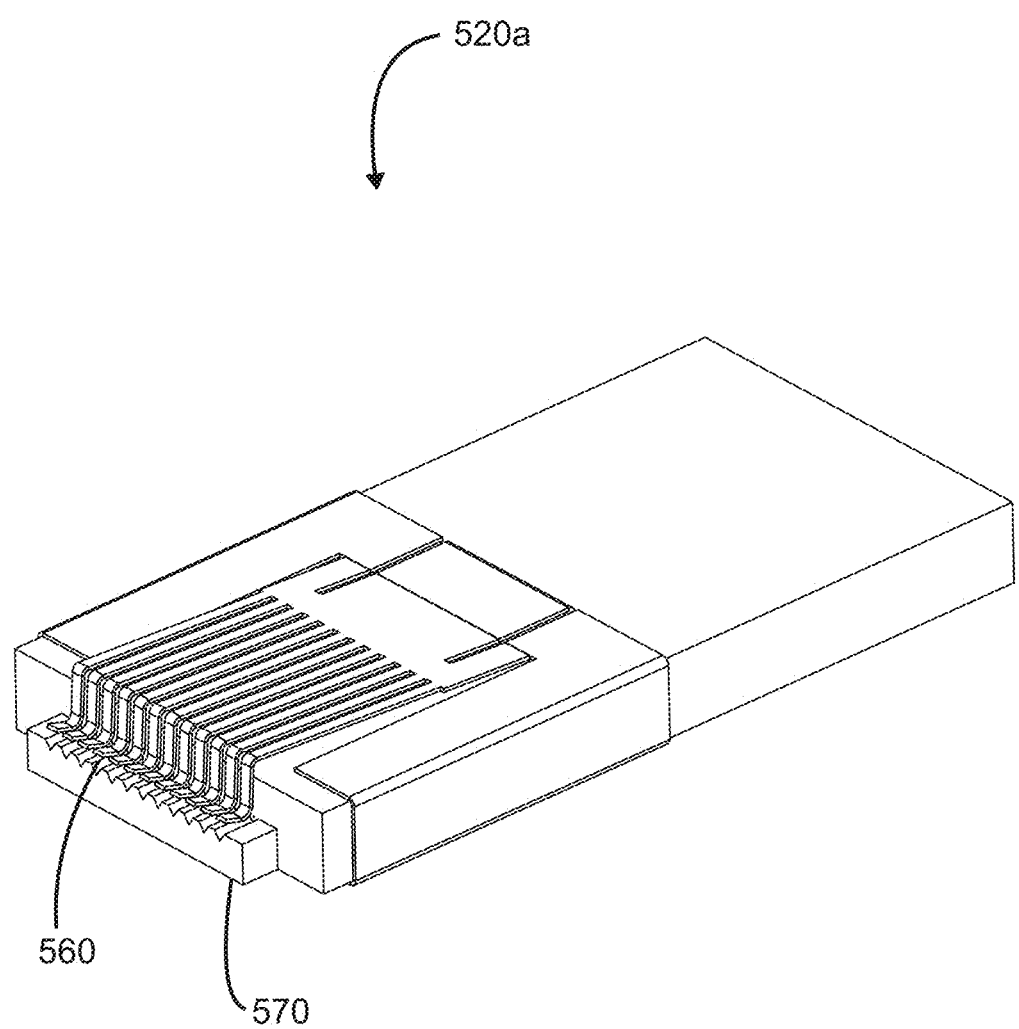
FIG. 36 is a perspective view of another planar lightguide circuit chip device in accordance with the principles of the present disclosure.
Figure 37:
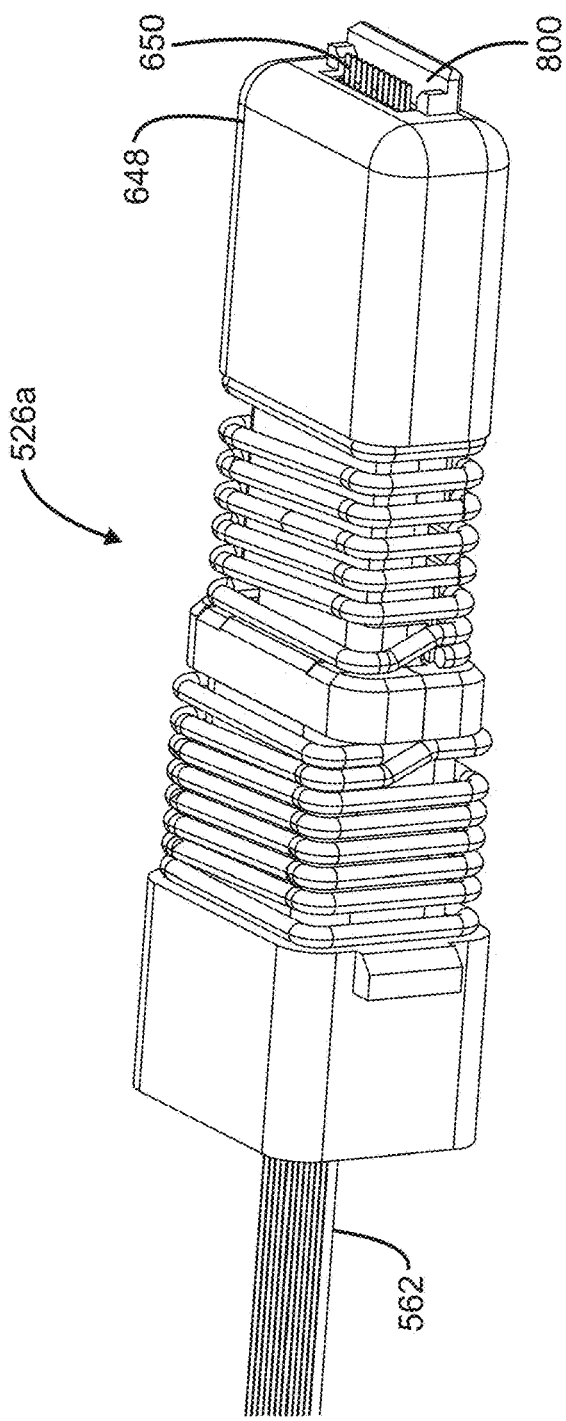
FIG. 37 is a perspective view of a bare-fiber optical connector adapted to optically couple with the planar lightguide circuit chip device of FIG. 36.
Figure 38:
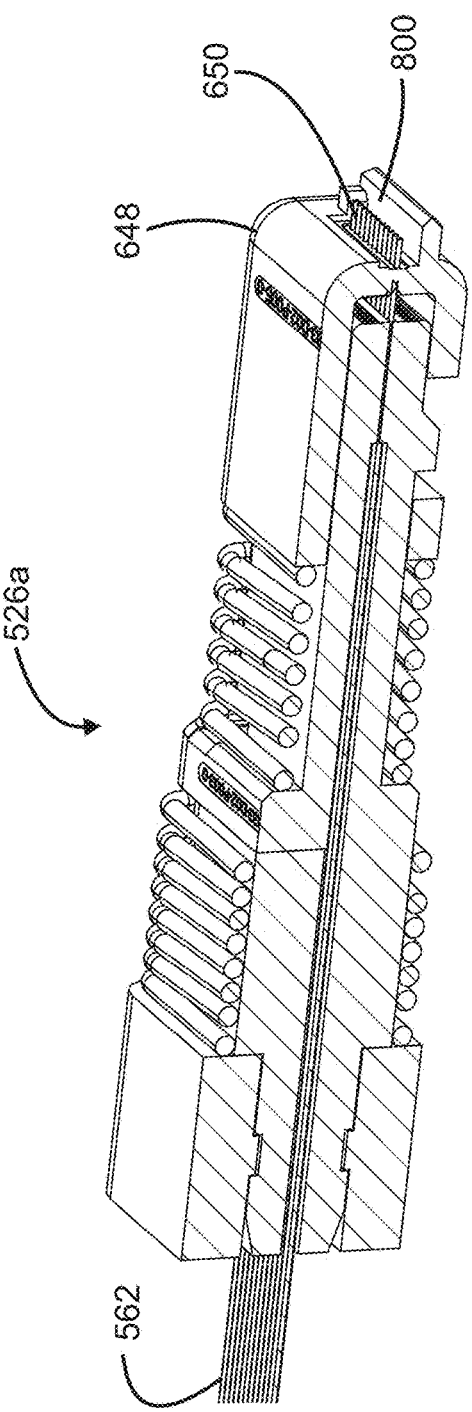
FIG. 38 is a cross-sectional view taken along a vertical reference plane cut longitudinally through the bare-fiber optical connector of FIG. 37.
Figure 39:
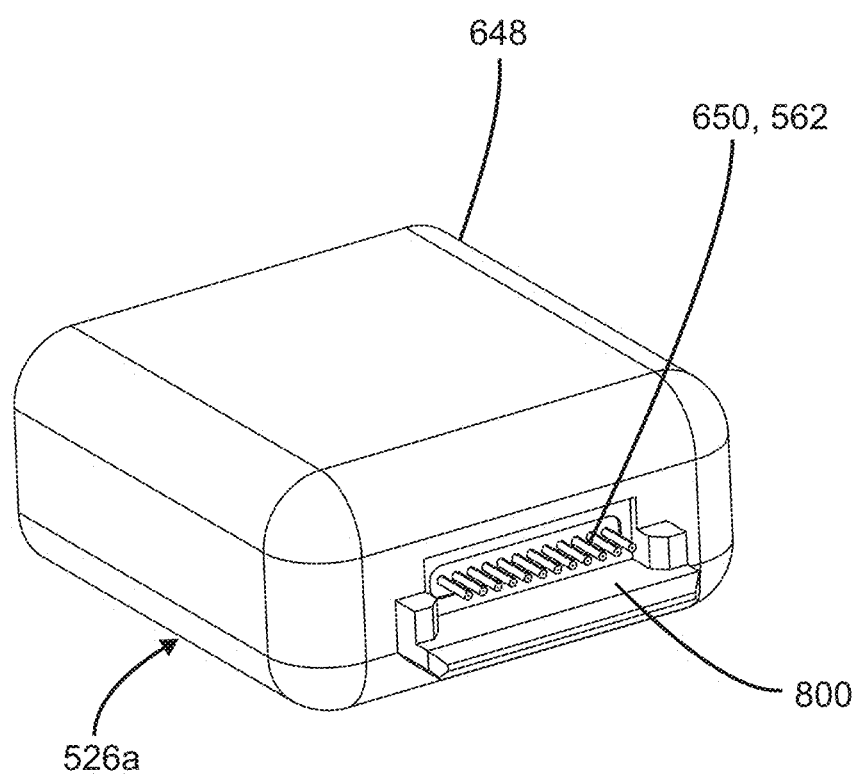
FIG. 39 is a perspective view of an end portion of the bare-fiber optical connector of FIG. 37.
Figure 40:
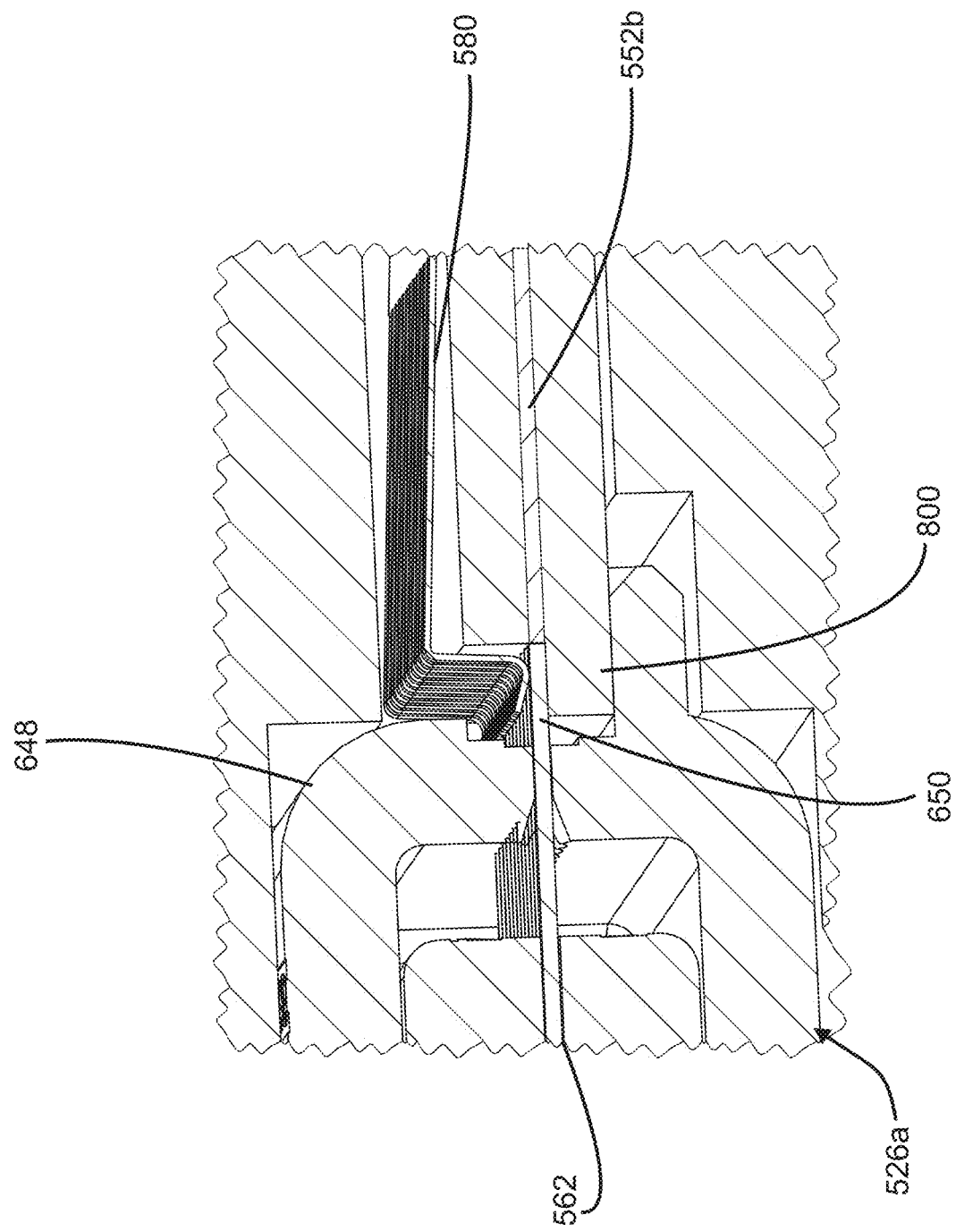
FIG. 40 is an enlarged view showing an optical connection interface between the planar lightguide circuit chip of FIG. 36 and the bare-fiber optical connector of FIG. 37.

FIG. 36 depicts an alternative optical device 520a in which the alignment pin openings 578 have been eliminated. Instead, the extension 570 itself is used to provide pre-alignment of the bare optical fibers of the connector with the fiber alignment grooves 560 on the extension 570. For example, FIGS. 37-40 show a modified connector 526a in which the pins 670 have been eliminated from the shroud 648. Instead, the shroud 648 includes a receptacle 800 at its end face adapted to receive and guide the extension prior to the optical fibers 562 reaching the fiber alignment grooves 560. In this way, contact between the body of the extension 570 and the body of the receptacle 800 provides pre-alignment of the optical fibers 562 with respect to the fiber alignment grooves 560. In certain examples, the receptacle 800 and/or the extension 570 can be tapered to enhance the pre-guiding functionality.

What is claimed is:

1. A fiber optic assembly adapted to be mounted within a housing of an optical connection device, the housing defining optical connection locations, the fiber optic assembly comprising:
a flexible substrate;
a plurality of first optical fibers having affixed segments bonded to the flexible substrate along fiber routing paths, the first optical fibers having first ends positioned at route termination locations, the route termination locations being relatively arranged to correspond to the optical connection locations of the optical connection device, the first ends of the first optical fibers being processed ends which have been processed to be suitable for making optical connections with other optical fibers, the first optical fibers having second ends; and a planar lightguide circuit chip having lightguides optically connected to the second ends of the first optical fibers, wherein first optical signal paths are defined that extend continuously from the first ends of the first optical fibers through the second ends of the first optical fibers to the lightguides without any optical fiber splices being located along the first optical signal paths.

2. The fiber optic assembly of claim 1, wherein the planar lightguide circuit chip is a passive optical power splitter.

3. The fiber optic assembly of claim 1, wherein the planar lightguide circuit chip provides optical tapping functionality.

4. The fiber optic assembly of claim 1, wherein the planar lightguide circuit chip provides passive optical power splitting or wavelength splitting, wherein the lightguides are output lightguides optically coupled to an input lightguide by an optical splitting arrangement, wherein a second optical fiber is optically connected to the input lightguide, wherein the second optical fiber has a first end and an opposite second end, the first end of the second optical fiber being a processed end which has been processed to be suitable for making an optical connection with other optical fibers, wherein a second optical signal path is defined that extends continuously from the first end of the second optical fiber through the second end of the second optical fiber to the input lightguide without any optical fiber splices being located along the second optical signal path.

5. The fiber optic assembly of claim 4, wherein the first optical fibers and the second optical fiber cooperate to define a fiber loop that extends along a perimeter of the flexible substrate around the route termination locations, and wherein the planar lightguide circuit chip is positioned along the fiber loop.

6. The fiber optic assembly of claim 5, wherein at least a majority of the fiber loop is formed by non-affixed segments of the first optical fibers and a non-affixed segment of the second optical fiber that are not bonded to the flexible substrate.

7. The fiber optic assembly of claim 6, wherein the planar lightguide circuit chip is secured to the flexible substrate.

8. The fiber optic assembly of claim 7, wherein the flexible substrate is elongate along a substrate length that extends between first and second substrate ends, wherein the flexible substrate includes a substrate width perpendicular to the substrate length that extends between first and second substrate sides, wherein the fiber loop has a loop length that extends along the substrate length and first and second loop ends positioned respectively at the first and second substrate ends, and wherein the planar lightguide circuit chip is positioned at the first loop end.

9. The fiber optic assembly of claim 8, wherein the first optical fibers transition from the affixed segments to the non-affixed segments at the second substrate end.

10. The fiber optic assembly of claim 9, wherein the flexible substrate includes a main body and an extension that projects outwardly from the main body at the second substrate end in a direction along the substrate length, the extension being adjacent to the first substrate side, the flexible substrate also including a finger that projects outwardly from the extension along the substrate width in a direction toward the second substrate side, the affixed segments of the first optical fibers extending along a length of the finger, and the first optical fibers transitioning from the affixed segments to the non-affixed segments at a free end of the finger.

11. The fiber optic assembly of claim 1, wherein the first ends of the first optical fibers are polished.

12. The fiber optic assembly of claim 1, wherein the first ends of the first optical fibers have been shaped by a non-contact energy source.

13. The fiber optic assembly of claim 1, further comprising ferrules supporting the first optical fibers at the first ends.

14. The fiber optic assembly of claim 1, further comprising fiber optic connectors installed at the first ends of the first optical fibers.

15. The fiber optic assembly of claim 1, wherein the first optical fibers are retained in a groove block adjacent the second ends of the first optical fibers, and wherein the groove block is secured to the planar lightguide circuit chip with the second ends of the first optical fibers co-axially aligned with the lightguides.

16. The fiber optic assembly of claim 15, wherein the groove block is adhesively bonded to the planar lightguide circuit chip.

17. The fiber optic assembly of claim 1, wherein the second ends of the first optical fibers are optically connected to the lightguides by a grating coupler.

* * * * *